US012211517B1

(12) United States Patent
Maas et al.

(10) Patent No.: US 12,211,517 B1
(45) Date of Patent: Jan. 28, 2025

(54) ENDPOINTING IN SPEECH PROCESSING

(71) Applicant: Amazon Technologies, Inc., Seattle, WA (US)

(72) Inventors: Roland Maximilian Rolf Maas, Seattle, WA (US); Bjorn Hoffmeister, Seattle, WA (US); Ariya Rastrow, Seattle, WA (US); James Garnet Droppo, Carnation, WA (US); Veerdhawal Pande, Walpole, MA (US); Maarten Van Segbroeck, San Diego, CA (US); Gautam Tiwari, Fremont, CA (US); Andrew Smith, Seattle, WA (US); Eli Joshua Fidler, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 543 days.

(21) Appl. No.: 17/475,699

(22) Filed: Sep. 15, 2021

(51) Int. Cl.
*G10L 25/78* (2013.01)
*G06N 3/045* (2023.01)
*G10L 15/26* (2006.01)
*G10L 25/30* (2013.01)

(52) U.S. Cl.
CPC .............. *G10L 25/78* (2013.01); *G06N 3/045* (2023.01); *G10L 15/26* (2013.01); *G10L 25/30* (2013.01); *G10L 2025/783* (2013.01)

(58) Field of Classification Search
CPC ......... G10L 25/78; G10L 15/26; G10L 25/30; G10L 2025/783; G06N 3/045
See application file for complete search history.

(56) References Cited

U.S. PATENT DOCUMENTS

| | | |
|---|---|---|
| 4,028,496 A | 6/1977 | LaMarche et al. |
| 4,410,763 A | 10/1983 | Strawczynski et al. |
| 5,295,190 A | 3/1994 | Yamashita et al. |
| 5,457,768 A | 10/1995 | Tsuboi et al. |
| 5,794,195 A | 8/1998 | Hormann et al. |
| 6,044,342 A | 3/2000 | Sato et al. |
| 6,782,363 B2 | 8/2004 | Lee et al. |

(Continued)

OTHER PUBLICATIONS

U.S. Appl. No. 13/921,671, filed Jun. 19, 2013.

*Primary Examiner* — Daniel C Washburn
*Assistant Examiner* — Athar N Pasha
(74) *Attorney, Agent, or Firm* — Pierce Atwood LLP

(57) ABSTRACT

A speech-processing system may determine potential endpoints in a user's speech. Such endpoint prediction may include determining a potential endpoint in a stream of audio data, and may additionally including determining an endpoint score representing a likelihood that the potential endpoint represents an end of speech representing a complete user input. When the potential endpoint has been determined, the system may publish a transcript of speech that preceded the potential endpoint, and send it to downstream components. The system may continue to transcribe audio data and determine additional potential endpoints while the downstream components process the transcript. The downstream components may determine whether the transcript is complete; e.g., represents the entirety of the user input. Final endpoint determinations may be made based on the results of the downstream processing including automatic speech recognition, natural language understanding, etc.

20 Claims, 14 Drawing Sheets

(56) References Cited

U.S. PATENT DOCUMENTS

| | | | |
|---|---|---|---|
| 6,873,953 B1 | 3/2005 | Lennig | |
| 7,412,376 B2 | 8/2008 | Florencio et al. | |
| 9,437,186 B1 * | 9/2016 | Liu | G10L 15/05 |
| 2002/0128816 A1 | 9/2002 | Haug et al. | |
| 2002/0147581 A1 | 10/2002 | Shriberg et al. | |
| 2004/0243393 A1 | 12/2004 | Wang | |
| 2007/0185717 A1 | 8/2007 | Bennett | |
| 2008/0172225 A1 | 7/2008 | Kim et al. | |
| 2010/0312557 A1 | 12/2010 | Strom et al. | |
| 2011/0313764 A1 | 12/2011 | Bacchiani et al. | |
| 2012/0191455 A1 | 7/2012 | Bou-Ghazale et al. | |
| 2018/0350395 A1 * | 12/2018 | Simko | G10L 15/187 |
| 2019/0318759 A1 * | 10/2019 | Doshi | G10L 15/04 |
| 2021/0280178 A1 * | 9/2021 | Bae | G10L 15/08 |
| 2022/0122589 A1 * | 4/2022 | Sharifi | G10L 15/30 |
| 2023/0053341 A1 * | 2/2023 | Konzelmann | G10L 15/18 |

* cited by examiner

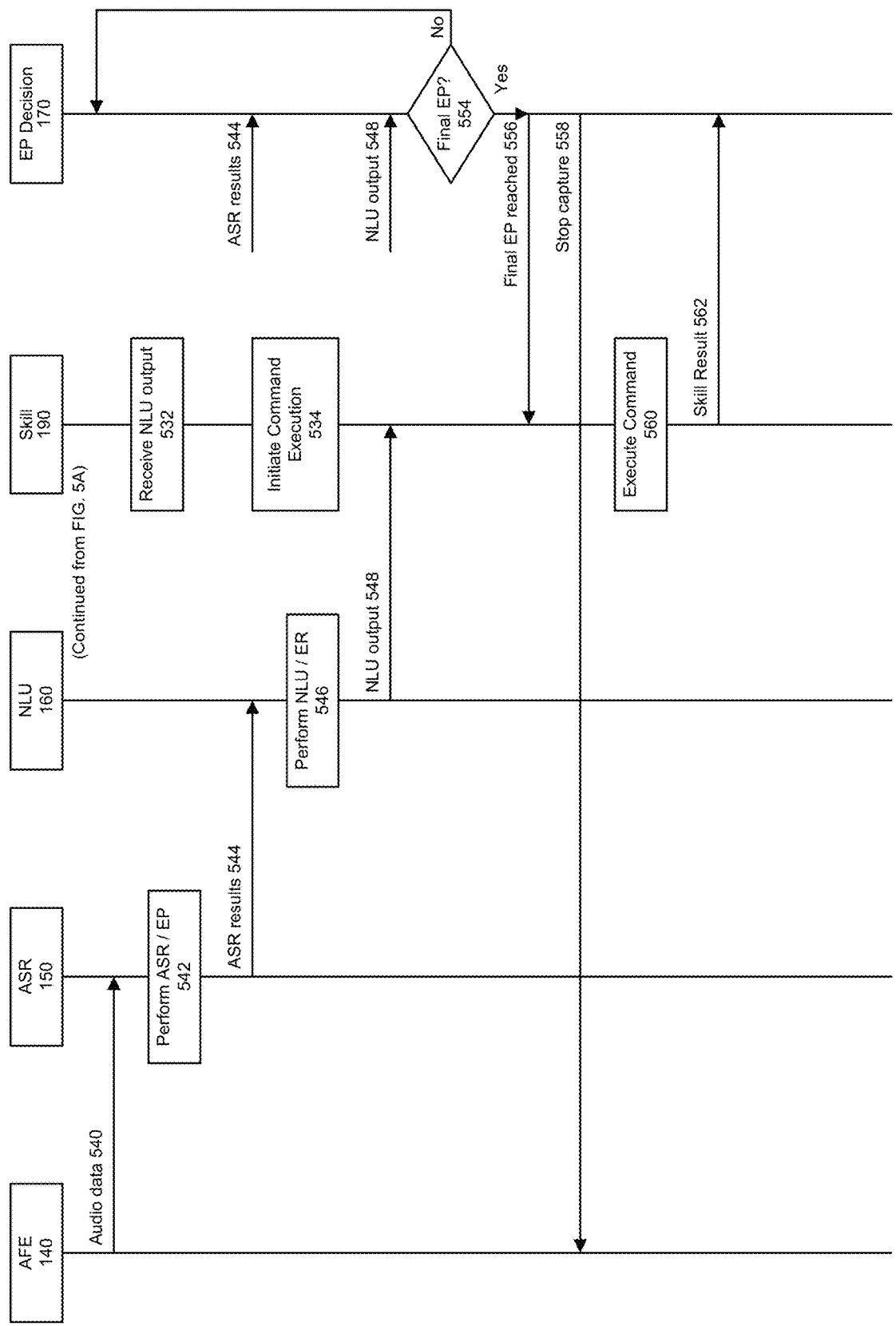

ENDPOINTING IN SPEECH PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken inputs. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A through 5B are signal-flow diagrams illustrating example operations of a speech processing system employing endpointing, according to embodiments of the present disclosure.

DETAILED DESCRIPTION

Figure 1:
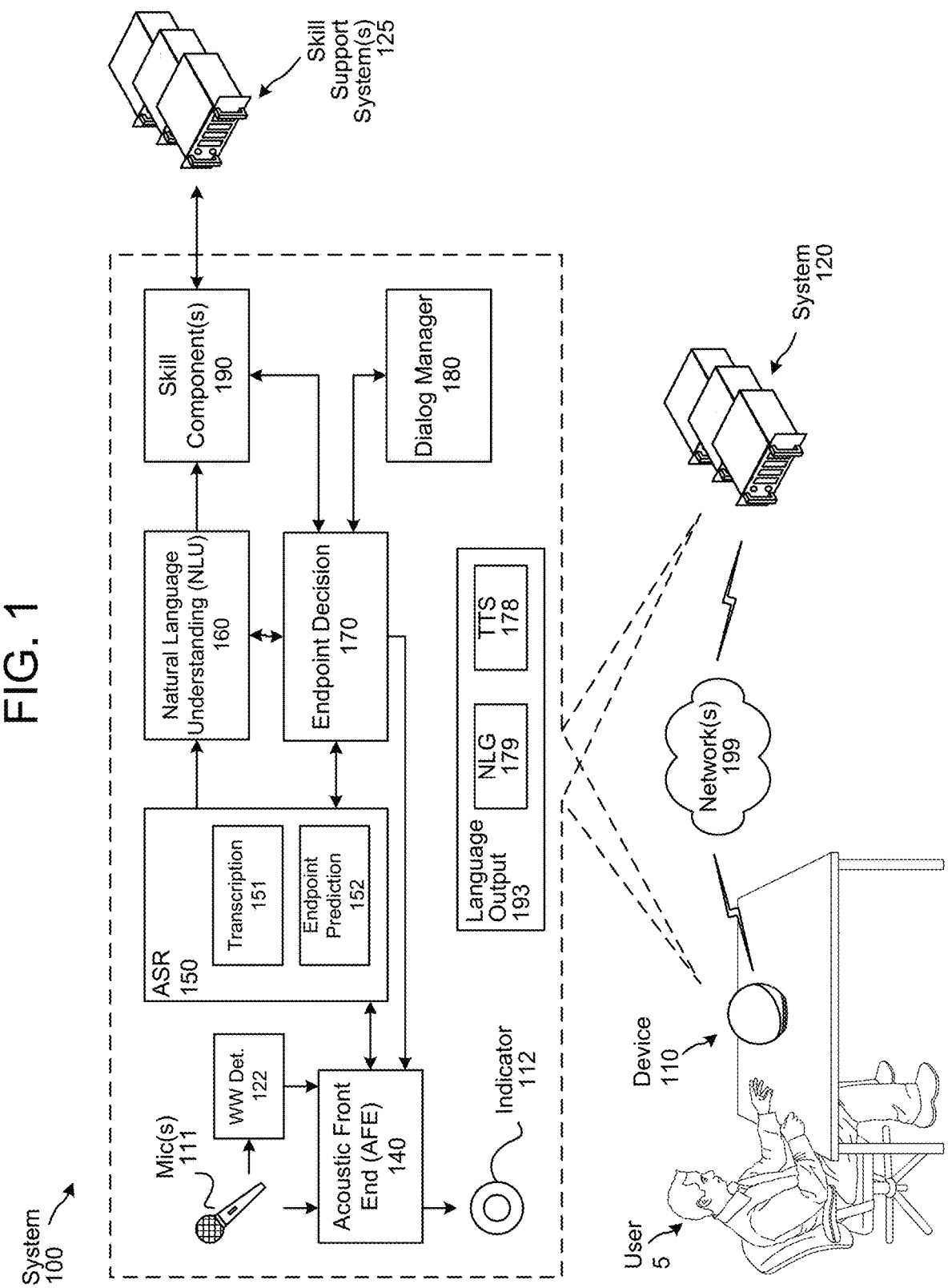
FIG. 1 is a conceptual diagram illustrating components of a speech processing system employing endpoint prediction, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system. The assistant can leverage the speech-processing system as well as additional applications and/or skills to perform tasks for and/or on behalf of the user.

When a user speaks to the speech processing system, the speech processing system may perform certain functions when the user finishes speaking (e.g., begin processing a machine representation of the input to determine a system response, output visual indicator or other content, output audio indicator or other content, etc.). The end of the speech within input audio data may be referred to as an "endpoint" within the audio data, and the process of determining where in the audio data the speech stops may be referred to as "endpointing." The user experience can be directly affected by the endpointing process and precision. For example, if the speech processing system determines an endpoint in the input audio data before the user has finished speaking (due to, for example, a pause in the user's speech), the speech processing system may attempt to process an incomplete user input, which may result in errors or poor results. Conversely, if the speech processing system waits an unnecessary, additional period of time before determining a speech endpoint (for example, to capture and process additional audio in case the user resumes speaking), the delay may increase latency prior to performing an action responsive to the user input.

This disclosure describes a speech processing system that may use endpointing. An ASR component of the system may transcribe speech and predict a potential endpoint. When the ASR component identifies a potential endpoint, the ASR component may publish ASR results and send them to one or more downstream components for further processing. The ASR results may include a transcript of speech received up to the endpoint as well as endpoint data. The endpoint data may include, for example, a symbol in the transcript that indicates the potential endpoint. The endpoint data may additional include an endpoint score associated with the potential endpoint, where the endpoint score indicates a likelihood that the potential endpoint represents an end of the speech; for example, that the transcribed speech represents an entirety of a user input such as a spoken request, command, and/or other system-directed speech. The ASR component may determine potential endpoints based on, for example, acoustic features of the speech and/or the transcript of the speech. The ASR component may send the ASR results and endpoint data to one or more downstream components such as NLU and/or skills for further processing.

The ASR component may continue to process audio data received after the potential endpoint. The ASR component may determine a second potential endpoint and publish second ASR results, and so on until the system makes a final endpoint decision. An NLU component may receive the ASR results and attempt to determine a request and/or command represented in the transcript; for example, by identifying one or more intents and/or entities represented in the ASR results. The NLU component may send NLU output data representing the command or request to a skill component for execution. The skill may attempt to process the NLU output data to perform an action for and/or on behalf of the user; however, the system may delay execution of the action until the final endpoint decision has been made.

The system may include an endpoint decision component that may make final endpoint decisions. The endpoint decision component may make final endpoint decisions based on, for example, the ASR results and endpoint data, and additionally based on output(s) from downstream component(s). For example, the endpoint decision component may include a trained model configured to make final endpoint decisions based on endpoint data, ASR results, NLU output data, dialog context, skill results, and/or user specific data (e.g., regarding users' speech characteristics). The endpoint decision component may output endpoint decision data, which the speech processing system may use to, for example, end audio capture and/or processing, trigger execution of the actions represented in the speech, and/or change a listening state of the system (e.g., from a listening state to a processing state and/or an idle state). A user device of the speech processing system may include one or more visual indicators that indicate a current listening state of the system to the user.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating components of a speech processing system 100 employing endpoint prediction, according to embodiments of the present disclosure. The system 100 may operate across a combination of devices and/or system such as a user device 110, a remote system 120, and/or one or more skill support systems 125. The various devices and/or systems may communicate over one or more computer networks 199. A user 5 may interact with the system 100 via the user device 110 using, for example, a combination of inputs including speech, gestures, images, and/or text. The system 100 may provide output to the user 5 in the form of audio (including synthesized speech), video, indicators such as lights on the device 110, and/or by performing actions in the physical world such as locking a car door, turning on a room light, adjusting volume of a media device, etc.

The system 100 may determine that it is to begin capturing audio. For example, a wakeword detection component 122 of the system 100 may detect a wakeword corresponding to a virtual assistant. One example wakeword is "Alexa." The wakeword detection component 122 may process the audio data captured by an acoustic front end (AFE) 140 to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

If the wakeword detection component 122 detects speech in audio data, the wakeword detection component 122 may further analyze the audio data to determine if specific characteristics of the audio data match preconfigured acoustic waveforms, audio signatures, or other data corresponding to a wakeword. Thus, the wakeword detection component 122 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 122 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In some implementations, the system 100 may determine that it is to begin capturing audio by detecting a gesture (e.g., a non-verbal physical movement) such as a button press or a wave to a camera of the device 110. In some implementations, the system 100 may determine that it is to begin capturing audio by detecting speech and determining that the speech is directed to the device 110 and/or the system 100; for example, based on audible or visual indications. Upon determining that the system 100 is to begin capturing audio, the system 100 may change a listening state from "idle" to "listening." In the listening state, the system 100 may activate a microphone 111 and begin generating audio data using the AFE 140. The AFE 140 may send the audio data to the ASR component 150.

The ASR component 150 may process the audio data to generate ASR results. The ASR component 150 may include a transcription component 151 and an endpoint prediction component 152. The ASR results may thus include a transcript of speech represented in the audio data as well as potential endpoints detected in the speech. The transcription component 151 may employ one or more trained models to generate a transcript of speech represented in the audio data. In some implementations, the transcript may include not only words (and/or subwords), but may further include indications of pauses and/or speech hesitations. A speech hesitation may be a spoken sound made during speech, such as "um" or "ah," etc. In some cases, however, a speech hesitation may be a word, possibly lengthened in duration relative to other words in the speech.

The endpoint prediction component 152 may include a machine learning model trained using training data representing speech transcripts that include endpoints to determine whether a potential endpoint has been reached. The model may be a standalone endpoint prediction model or may be included in an end-to-end ASR model, such that a transcript of audio data includes tokens for potential endpoints (e.g., an "</s>" token or the like). In some implementations, a potential endpoint in the ASR results may be associated with a score indicating that the potential endpoint represents an endpoint of a user input. The endpoint prediction component 152 may take as inputs both acoustic features (e.g., raw audio data) as well as the output of the transcription component 151 (e.g., recognized speech), which may results in performance improvements over endpoint determinations made on acoustic information alone.

In some implementations, the ASR component 150 may determine whether the endpoint score satisfies certain conditions. For example, if an endpoint score exceeds a first threshold, the ASR component 150 may determine that the speech preceding the potential endpoint represents an entirety of a user input. In response, the ASR component 150 may publish ASR results corresponding to audio data received before the endpoint, including a transcript of speech represented in the audio data, the potential endpoint, and the associated endpoint score. The ASR component 150 may send the ASR results to downstream components including, for example, the NLU component 160 and an endpoint decision component 170. The ASR component 150 may, however, continue receiving and processing audio data to generate additional ASR results. Thus, the ASR component 150 may process the audio data as a stream, and may publish further ASR results when it determines another potential endpoint. In some implementations, subsequent ASR results may represent an augmented or refined transcript of prior ASR results (e.g., the subsequent ASR results may include a transcript of speech received before a prior endpoint, and that transcript may match the prior transcript, or may represent a refinement of the prior transcript based on the additional audio data received after the prior endpoint).

In some implementations, the ASR component 150 may determine whether an endpoint score exceeds a second threshold. The second threshold may represent a high confidence that the user 5 has finished speaking. In such cases, the ASR component 150 may cease processing audio data. In some implementations, the ASR component 150, upon detecting such a high-confidence endpoint, may cause the AFE 140 to stop generating audio data, or may otherwise close the microphone until such time as the system 100 receives another indication to resume capturing audio (e.g., due to detection of a wakeword). In some implementations, however, the AFE 140 and/or the ASR component 150 may continue processing audio until a final endpoint decision has been made; for example, by the endpoint decision component 170.

In some implementations, the ASR component 150 may determine additional events and/or scores. For example, the ASR component 150 may make predictions regarding whether speech is directed to the system 100 (e.g., system directed input detection or "SDD") and/or speaker identification (SID). In some implementations, the ASR component 150 may employ a deep neural network (DNN) model for processing the audio data. In some implementations, the DNN may take the form of a recurrent network, such as a recurrent neural network transducer (RNN-T). These and other features of the ASR component 150 are described in additional detail below with reference to FIG. 2.

Downstream components may receive the ASR results from the ASR component 150 and perform additional processing to interpret and/or execute the user input, and to determine a final endpoint of the speech. The system 100 may include an NLU component 160 for determining a semantic interpretation of phrase(s) and/or statement(s) represented in the ASR results. For example, the NLU component 160 may determine an intent representing an action that the user 5 wishes the system 100 to perform. The NLU component 160 may additionally resolve one or more entities represented in the ASR results, and to which the intent refers. The NLU component 160 may send NLU output data representing the intent and/or entity information to one or more other components such as a skill component 190 and/or the endpoint decision component 170.

In some implementations, the NLU component 160 may determine that the ASR results potentially represent an incomplete transcript of a user input. For example, the NLU component 160 may determine that the ASR results include an intent that typically refers to an entity. Such a partial transcript could include the words "Play music." The NLU component 160 may determine that the ASR results represent a <PlayMusic> intent, and that such an intent typically refers to an artist (e.g., "Play music by the Beethoven."). The NLU component 160 may determine whether the ASR results represent a complete user input based on additional data as well. For example, the NLU component 160 may make the determination based on the endpoint score represented in the ASR results, disfluencies, and/or speech hesitations included in the transcript such as "ah" and "um." The NLU component 160 may therefore determine whether to send NLU output data based on the ASR results, whether to await additional ASR results, and/or whether to end processing of ASR results related to the utterance (e.g., if the NLU component 160 determines that the ASR results likely represent an entirety of a user input). These and other features of the NLU component 160 are described in additional detail below with reference to FIG. 9.

The system 100 may include one or more skill components 190 for executing one or more requests/commands represented in the NLU output data. A skill component 190 may be software running on the system 100 that is akin to a software application. That is, a skill component 190 may enable the system 100 to execute specific functionality in order to provide data or produce some other requested output. As used herein, a "skill component" may refer to software that may be placed on a machine or a virtual machine (e.g., software that may be launched in a virtual instance when called). A skill component 190 may be software customized to perform one or more actions as indicated by a business entity, device manufacturer, user, etc. What is described herein as a skill component 190 may be referred to using many different terms, such as an action, bot, app, or the like. The system 100 may be configured with more than one skill component 190. For example, a weather service skill component may enable the system 100 to provide weather information, a car service skill component may enable the system 100 to book a trip with respect to a taxi or ride sharing service, a restaurant skill component may enable the system 100 to order a pizza with respect to the restaurant's online ordering system, etc. A skill component 190 may operate in conjunction between the various device of the system 100 including one or more user devices 110, system(s) 120, and skill support system(s) 125 in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

Figures 6A, 6B, 6C:
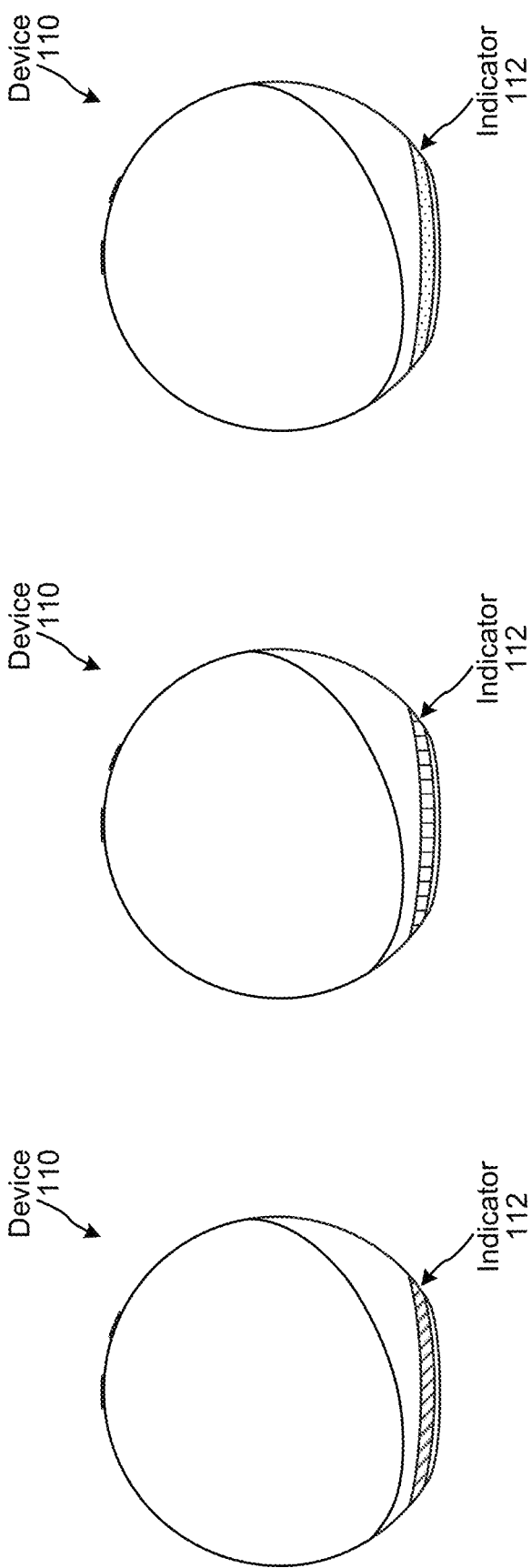
FIGS. 6A through 6C illustrate examples of indicators indicating different listening modes of a device, according to embodiments of the present disclosure.

The system 100 may include an endpoint decision component 170 for making and/or implementing decisions with regard to potential and final endpoints of received speech. The endpoint decision component 170 may include a machine learning model such as a DNN configured to receive input from various sources such the ASR results (including a transcript of the speech including speech hesitations and potential endpoints and endpoint scores), NLU output data (including intents, entities, and/or null results), skill results, dialog context data, and/or user specific data. The endpoint decision component 170 may be trained to process this data and issue endpoint decision data representing a determination of whether a potential endpoint likely represents an end of an entirety of a user input. The endpoint decision data may be used to, for example, change a listening mode of the system 100. For example, if the endpoint decision component 170 determines that a potential endpoint represents final endpoint with a moderate confidence, the system 100 may change from a listening state (e.g., in which speech is transcribed and sent to downstream components) to an idle stat (e.g., in which no audio data is transcribed until the system 100 receives an indication to resume processing speech). In some implementations, the system 100 may further include a "passive listening" mode in which speech is transcribed and stored provisionally as additional ASR results. If the potential endpoint is determined to be a final endpoint, or more system-directed speech is detected subsequent to the potential endpoint, the system 100 may send the additional ASR results to the downstream components. The current listening mode of the system 100 may be indicated to the user 5 using various indications such as light, displayed images, emitted sounds, etc. FIGS. 6A through 6C, described below, illustrates indicators of example listening modes of the system 100. Thus, based on the endpoint decision data issued by the endpoint decision component 170, various components of the system 100 including the ASR component 150, NLU component 160, and/or skill components 190 may complete processing with regard to received speech. The endpoint decision component 170 is described in additional detail below with reference to FIG. 4.

The system 100 may include a dialog manager 180 that may manage and/or track a dialog between the user 5 and the system 100. As used herein, a "dialog" may refer to data transmissions (such as relating to multiple user 5 inputs and system 100 outputs) between the system 100 and the user 5 (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog. Outputs of the dialog manager 180 may be used, for example, by the NLU component 160 to resolve entities, and by the endpoint decision component 170 in its decisions regarding the completeness of ASR results with respect to a user input and/or the finality of a potential endpoint. The dialog manager 180 is described in additional detail below with reference to FIG. 10.

The system 100 may include language output components 193. The language output components 193 may include a natural language generation (NLG) component 179 and a text-to-speech (TTS) component 178. The NLG component 179 can generate text for purposes of TTS output to a user. For example the NLG component 179 may generate text corresponding to instructions corresponding to a particular action for the user to perform. The NLG component 179 may generate appropriate text for various outputs as described herein. The NLG component 179 may include one or more trained models configured to output text appropriate for a particular input. The text output by the NLG component 179 may become input for the TTS component 178 (e.g., output text data 1079 discussed below). Alternatively or in addition, the TTS component 178 may receive text data from a skill component 190 or other system component for output as synthesized speech.

The NLG component 179 may include a trained model. The NLG component 179 may generate text data 1079 from dialog data received by the dialog manager 180 such that the output text data 1079 has a natural feel and, in some embodiments, includes words and/or phrases specifically formatted for a requesting individual. The NLG may use templates to formulate responses. And/or the NLG system may include models trained from the various templates for forming the output text data 1079. For example, the NLG system may analyze transcripts of local news programs, television shows, sporting events, or any other media program to obtain common components of a relevant language and/or region. As one illustrative example, the NLG system may analyze a transcript of a regional sports program to determine commonly used words or phrases for describing scores or other sporting news for a particular region. The NLG may further receive, as inputs, a dialog history, an indicator of a level of formality, and/or a user input history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 178.

The TTS component 178 may generate audio data (e.g., synthesized speech) from text data using one or more different methods. Text data input to the TTS component 178 may come from a skill component 190, an orchestrator component (e.g., handling transfer of data between components of the system 100), or another component of the system. In one method of synthesis called unit selection, the TTS component 178 matches text data against a database of recorded speech. The TTS component 178 selects matching units of recorded speech and concatenates the units together to form audio data. In another method of synthesis called parametric synthesis, the TTS component 178 varies parameters such as frequency, volume, and noise to create audio data including an artificial speech waveform. Parametric synthesis uses a computerized voice generator, sometimes called a vocoder.

Figure 2:
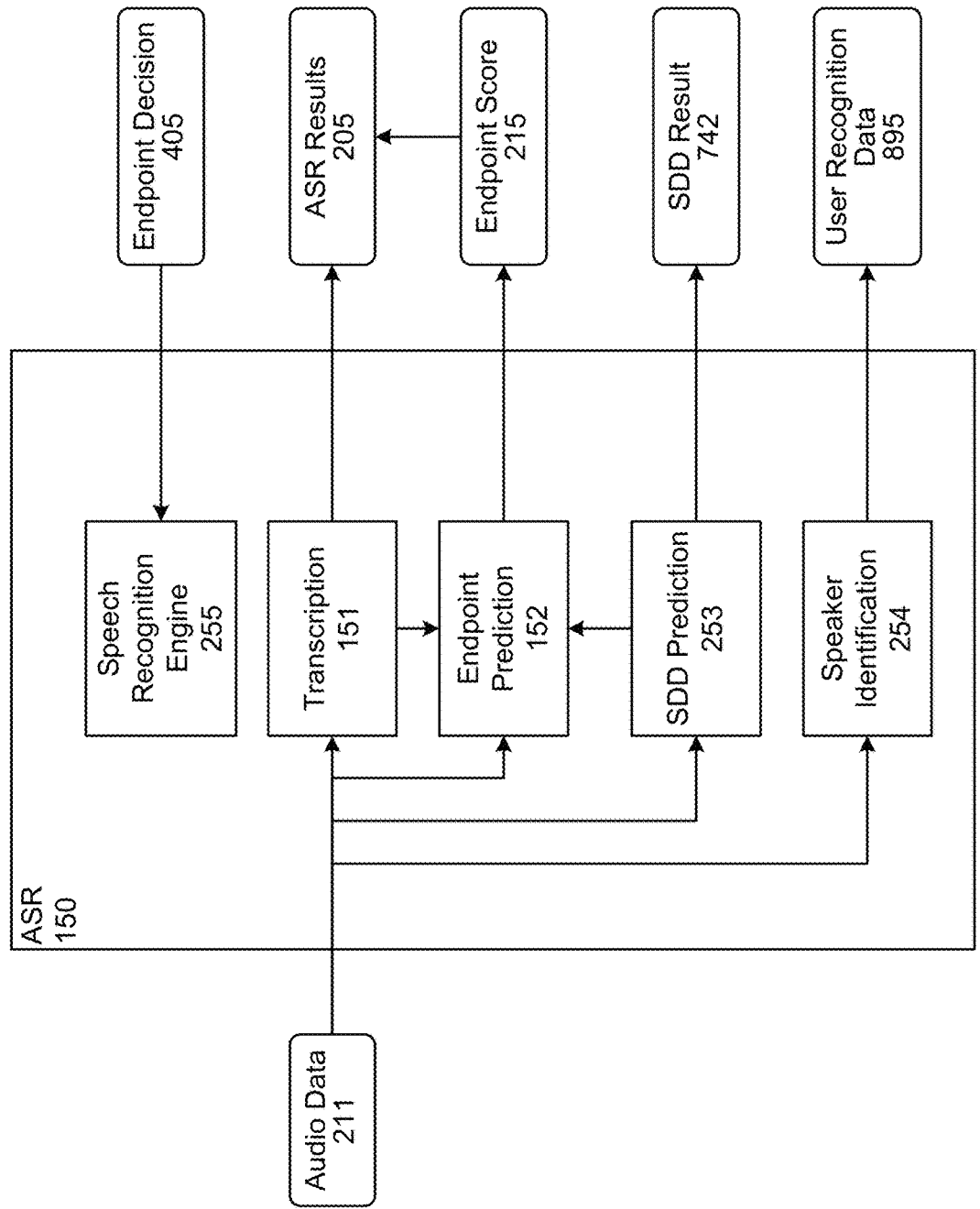
FIG. 2 is a conceptual diagram of an ASR component with endpoint prediction, according to embodiments of the present disclosure.
Figure 3:
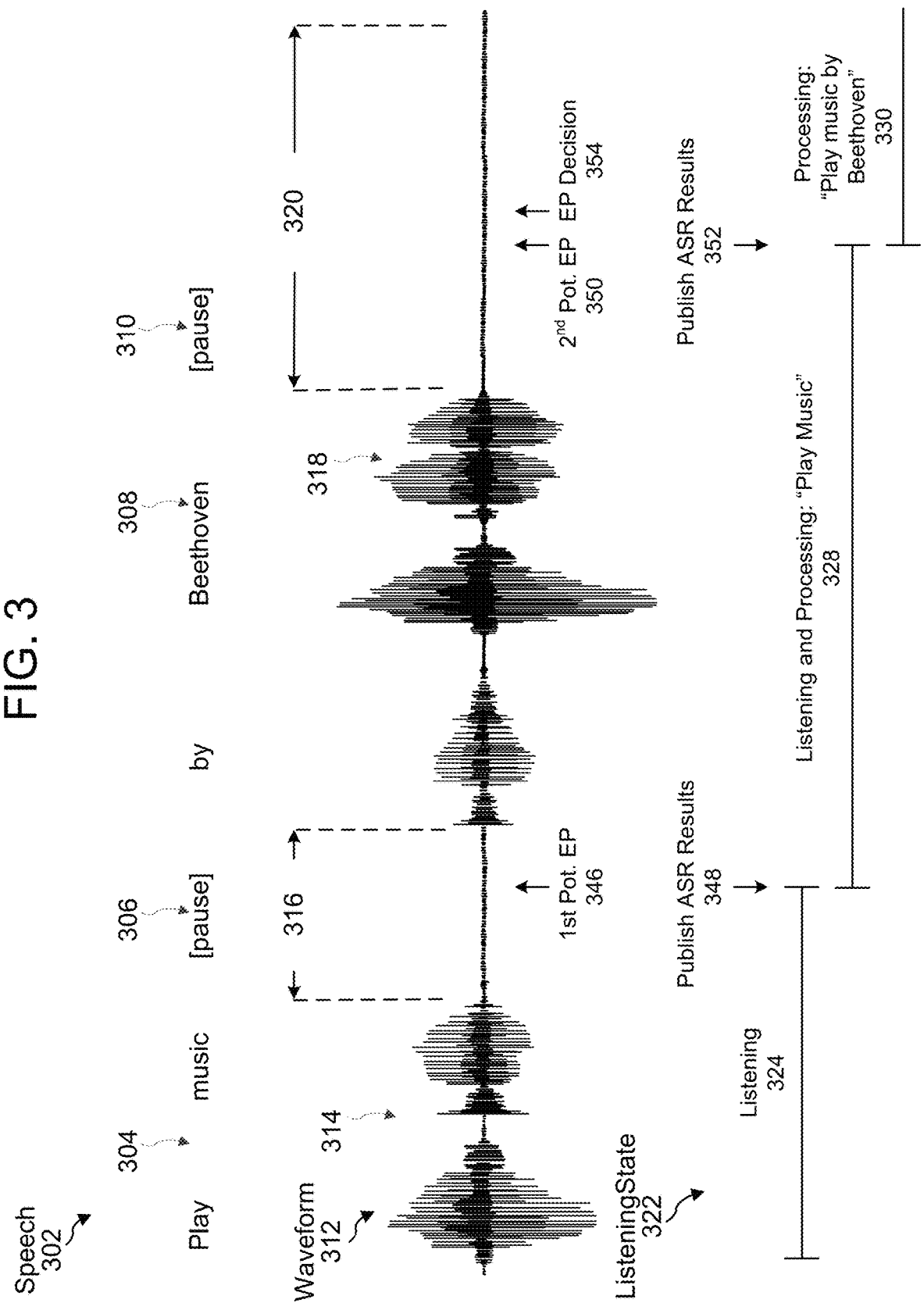
FIG. 3 illustrates an example of endpointing, according to embodiments of the present disclosure.

FIG. 2 is a conceptual diagram of an ASR component 150 endpoint prediction, according to embodiments of the present disclosure. The ASR component 150 may receive audio data 211 (e.g., from the AFE 140) and generate ASR results 205. In some implementations, the ASR component 150 may process the audio data 211 and generate the ASR results 205 continuously; e.g., as a stream. The ASR component 150 may publish the ASR results 205 when the endpoint prediction component 152 determines a potential endpoint. In some implementations, the ASR component 150 may publish the ASR results 205 when an endpoint score 215 of the potential endpoint satisfies a first condition; e.g., exceeds a first threshold indicating that a transcript of speech preceding the potential endpoint likely represents an entirety of a user input. In some implementations, the ASR component 150 may cease processing the audio data 211 of the endpoint score 215 satisfies a second condition; e.g., exceeds a second threshold indicating a high likelihood that the potential endpoint represents a final endpoint of the speech. In some implementations, the ASR component 150 may cease processing the audio data 211 upon receiving endpoint decision data 405 from the endpoint decision component 170. FIG. 3 below illustrates an example waveform representing the audio data 211 as well as words and potential endpoints determined therein.

The ASR component 150 may begin processing the audio data 211 upon receiving an indication to begin processing received speech. The indication may take the form of a wakeword detection signal (e.g., from a wakeword detection component 122), a gesture such as pressing a button of the device 110 or waving at a camera of the device 110, or detecting system directed speech (e.g., with the SDD prediction component 253 as described in additional detail below with reference to FIG. 7).

Upon receiving an indication to begin processing the audio data 211, a speech recognition engine 255 of the ASR component 150 may begin processing the audio data 211 using one or more of the transcription component 151, endpoint prediction component 152, SDD prediction component 253, and/or the speaker identification component 254. In some implementations, the ASR component 150 may include an end-to-end ASR model in the form of an RNN-T. An end-to-end ASR model may combine, for example, functions of an acoustic model, a language model, and/or a pronunciation model into a single DNN. For example, the ASR model may represent a neural network including, for example, and encoder and decoder networks trained using examples of human speech to infer words and/or subwords based on the received audio data 211. In some implementations, the speech recognition engine 255 may alternatively or additionally compare the audio data 211 with the acoustic models, pronunciation models, language models, FST(s), and/or other data models and information for recognizing the speech conveyed in the audio data. The audio data 211 may be audio data that has been digitized (for example by the AFE 140) into frames representing time intervals for which the AFE 140 determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE 140 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

In addition, the ASR model may further include the functions of the components 151, 152, 253, and/or 254. The speech recognition engine 255 may process the audio data 211 using the ASR model to generate ASR results including text data (e.g., a transcript), potential endpoints, endpoint scores 215, SDD predictions, and/or speaker identification data (e.g., a speaker identifier representing a known user). The potential endpoints/scores 215, SDD prediction, and/or SID may be represented by data (e.g., tokens) in or accompanying the ASR results 205. The ASR model may be trained based on data including such tokens (e.g., in the form of an end-of-sentence token </s>).

The speech recognition engine 255 may employ one or more search or classification techniques such as a greedy search or beam search. In a greedy search, the speech recognition engine 255 may use the ASR model to generate a single best transcript of the audio data 211. In a beam search, the speech recognition engine 255 may generate multiple alternative transcripts, possibly with associated probabilities. The multiple alternative transcripts may be output, for example, as a word lattice. A word lattice may give downstream components such as the NLU component 160 more information for use in determining semantic interpretations of the speech, and may lead to more accurate results.

In some implementations, the ASR component 150 may additionally include acoustic endpoint detection features such as a voice-activity-detector (VAD) (e.g., similar to that used for wakeword detection and SDD) and/or an end-of-query (EOQ) classifier. A VAD may be trained to classify audio data (e.g., individual frames of audio data representing, e.g., 30 ms of audio) as either speech or silence/non-speech. VAD-based endpoint detection may determine potential endpoints based on a certain amount of time elapsing without detecting speech. An EOQ classifier may be trained to predict whether the user 5 has finished speaking at a given time, and may be able to distinguish between an intermediate silence (e.g., indicating a false endpoint) and a final silence (e.g., indicating a final endpoint). While endpoint predictions from a VAD and/or an EOQ classifier may be useful to an endpoint determination and/or an endpoint decision, they may be based on acoustic data; that is, without regard to information from the transcript. Thus, endpoint prediction using the end-to-end ASR model, which leverages the transcript in endpoint determination, may provide better results.

FIG. 3 illustrates an example of endpointing, according to embodiments of the present disclosure. FIG. 3 illustrates an example stream of speech 302 and a corresponding waveform 312 represented by the audio data 211. The speech 302 includes a first utterance 304, followed by a first pause 306, a second utterance 308, and a second pause 310. The waveform 312 may include portions corresponding to the speech 302, including a portion 314 corresponding to the first utterance 304, a portion 316 corresponding to the first pause 306, a portion 318 corresponding to the second utterance 308, and a portion 320 corresponding to the second pause 310. The ASR component 150 may receive the waveform 312 from the AFE 140 following an indication to begin processing audio data. The ASR component 150 may process the waveform 312, during which the endpoint prediction component 152 may determine one or more potential endpoints. (In some implementations, the ASR component 150 may process the waveform 312 after it has been converted to frequency domain data using, for example, a fast-Fourier transform algorithm.) In the example waveform 312 shown in FIG. 3, the ASR component 150 may, after a certain duration of the pause 306, determine that a first potential endpoint 346 has occurred in the speech 302. The determination may be based, for example, acoustic information and/or speech recognition data (e.g., detecting no speech in a number of successive frames of the audio data 211 and/or based on words/phrases transcribed from the speech 302). If the ASR component 150 determines that an endpoint score 215 for the first potential endpoint 346 satisfies a condition (e.g., exceeds a certain threshold), the ASR component 150 may publish 348 the ASR results representing a transcript of the speech 302 received prior to the first potential endpoint 346 (along with additional data such as SDD, SID, etc.). In some implementations, the system 100 may update a listening state 322 of the device. For example, after receiving an indication to begin receiving audio, the device 110 may enter a listening state 324. Following an endpoint prediction (e.g., the first potential endpoint 346), the device 110 may enter a listening/processing state 328 in which the device 110 is still capturing audio while the system 100 processes the first published ASR results including a transcript of the first utterance 304, "play music." Because the system 100 has not made a final endpoint decision, the system 100 may continue transcribing additional speech for use in the event that the transcript of the first utterance 304 is followed by additional system-directed speech.

In the example shown in FIG. 3, the system 100 may attempt to execute a request/command according to the first utterance 304; that is, to "Play Music." The system 100 may begin playing music from a default play list associated with the user 5, or a song picked at random. The system 100 may later determine, however, that the <PlayMusic> intent typically executes with respect to an entity, and further that the NLU component 160 did not resolve any corresponding entities in the first utterance 304. Thus, the system 100 may continue to capture audio and publish additional ASR results. When the ASR component 150 predicts a second potential endpoint 350 following the second utterance 308, the ASR component 150 may publish 352 additional ASR results reflecting the first utterance 304 and the second utterance 308. The system 100 may then process the additional ASR results, and the music skill may halt any music currently playing in response to the first utterance 304, and begin playing music by Beethoven.

Following determination of the second potential endpoint 350, the system 100 (e.g., using the endpoint decision component 170), may make a final endpoint decision 354. For example, the endpoint decision component 170 may determine that the second potential endpoint 350 or a point in time after the second potential endpoint 350 represents a final endpoint of the speech 302. The system 100 may make the endpoint decision additionally based on a combination of, for example, an endpoint score generated by the ASR component 150, NLU results data corresponding to the speech 302, skill results data, and/or dialog context data. Thus, the system 100 may change the listening state 322 to a processing state 330 (e.g., a non-listening processing state), possibly followed an idle state in which no speech is transcribed or processed. The system 100 may resume processing audio data following receipt of another indication to return to the active listening state 324.

Figure 4:
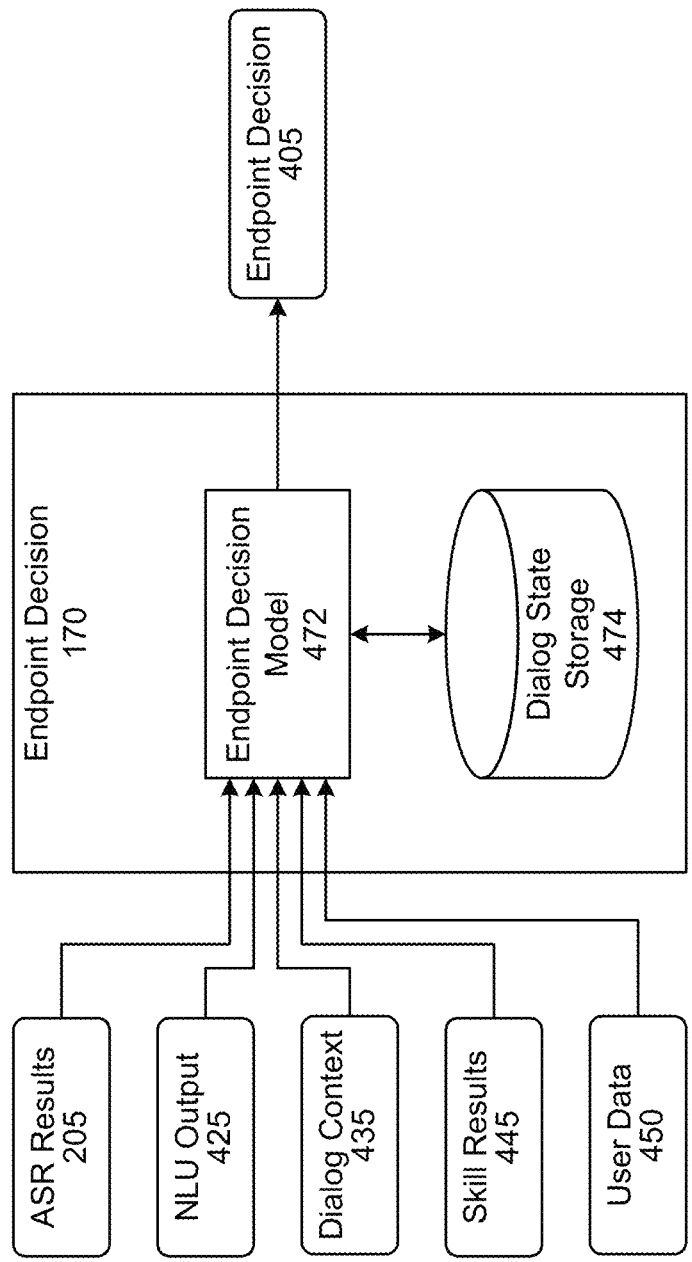
FIG. 4 is a conceptual diagram illustrating an endpoint decision component, according to embodiments of the present disclosure.

FIG. 4 is a conceptual diagram illustrating an endpoint decision component 170, according to embodiments of the present disclosure. The endpoint decision component 170 may include an endpoint decision model 472 and a dialog state storage component 474. The endpoint decision model 472 may be, for example, a DNN of various architectures trained to output an endpoint decision (e.g., endpoint decision data 405) based on various inputs. The dialog state storage component 474 may maintain state information for various dialogs currently being handled by the system 100. The state information may include, for example, data related to utterances that have already been processed in a given dialog. The endpoint decision model 472 may use this state data when processing data for a subsequent utterance of a speech stream.

The endpoint decision model 472 may be, for example, a recurrent neural network such as an LSTM, conformer, or transformer. The endpoint decision model 472 may be customizable to individual users or groups of users (e.g., based on age, regional dialects, etc.). The endpoint decision component 170 can receive the ASR results 205, the NLU output data 425, dialog context data 435 (e.g., from the dialog manager 180), skill results data 445, and/or user data 450 (e.g., from a user profile storage). The NLU output data 425 may include, for example, one or more intents and/or entities. In some cases, however, the NLU output data 424 may include a null output, which may indicate that the NLU component could not classify an intent and/or recognize an entity. In some cases, the NLU output data 425 may include successive NLU hypotheses based on respective ASR results associated with successive potential endpoints. In some implementations, the endpoint decision component 170 may determine that second NLU output data corresponding to user utterance may represent a self-correction of first NLU output data corresponding to the utterance. That is, the second NLU output data may represent a change in contents of the first NLU output data. For example, the user may say, "Please play Beethoven's Sonata Number Fourteen—I mean Twenty-One." In such cases, the system 100 may determine that a pause after the word "fourteen" represents a first potential endpoint. Thus, the first ASR results data and NLU output data may represent a user input of "Please play Beethoven's Sonata Number Fourteen." The second ASR results data may represent the complete user input "Please play Beethoven's Sonata Number Fourteen—I mean Twenty-One," and NLU output data may represent the user's correction to play the Sonata Number 21. The endpoint decision component 170 may thus determine that the self-correction represented in the second NLU output data indicates that the first potential endpoint does not represent a final endpoint. The endpoint decision component 170 may further determine that the second transcription including the self-correction represents the complete user input (e.g., based on the endpoint scores, the first and second ASR results data, the first and second NLU output data, etc.).

The user data 450 may include, for example, characteristics of a user's speech such as speech cadence, pauses, inflections (e.g., indicating the end of a command, request, and/or question), and other data that the endpoint decision model 472 may process in order to render endpoint decisions. For example, the user data 450 may indicate that a user tends to speak slowly or quickly, with few pauses or many pauses, and/or with long pauses or short pauses. The user data 450 may additionally include information regarding a user's usage of the speech processing system. For example, if a user uses the speech processing system extensively, their range of possible intents and/or entities may be broad, and/or they may be more likely to make complex utterances—thus, the endpoint decision model 472 may be less likely to make a final endpoint decision after receiving a small number of words. In contrast, a less frequent user of the speech processing system may tend to make shorter utterances that relate to a smaller number of skills—thus, the endpoint decision model 472 may bias more towards and earlier final endpoint decision. The endpoint decision component 170 may input the various data into the endpoint decision model 472. The endpoint decision component 170 may additionally retrieve dialog state information from the dialog state storage component 474 for input into the endpoint decision model 472. The endpoint decision model 472 may process the data to determine endpoint decision data 405. The endpoint decision data 405 may be an indication that the audio capture and/or processing should continue, that it should cease, and/or that the listening mode of the system 100 should be changed. In some implementations, the endpoint decision data 405 may include and endpoint score representing a likelihood that a final endpoint for the speech has been determined. A separate component of the system 100—for example, an application acting as a user interface for the virtual assistant system—may make the final determination regarding a listening state of the system 100 and/or whether to continue generating and/or processing audio data. The endpoint decision component 170 may send the endpoint decision data 405 to various components of the system including the AFE 140 (e.g., to indicate that the AFE 140 should close the microphone and stop generating audio data), the ASR component 150 (e.g., to indicate that a complete user input has been determined and no further transcription should be performed), the NLU component 160 (e.g., to indicate that no additional ASR results will be forthcoming with respect to the current user input), the skill components 190, and/or the dialog manager 180.

Figure 5A:
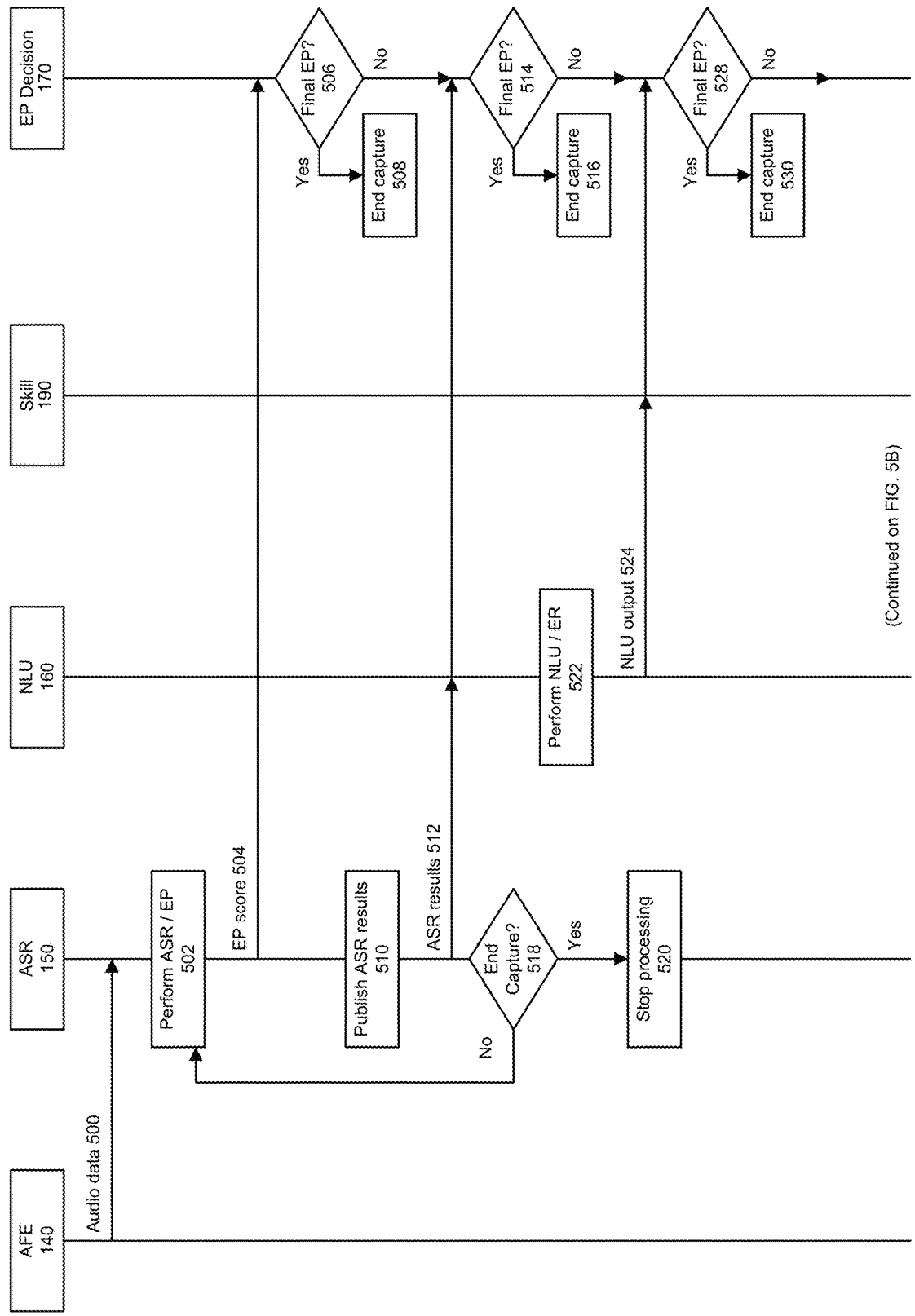

FIGS. 5A through 5B are signal-flow diagrams illustrating example operations of a speech processing system 100 employing continuous endpointing, according to embodiments of the present disclosure. FIGS. 5A and 5B are given as an example only, and the system 100 may repeat, omit, add, and/or reorder steps depending on the speech being processed and without departing from the scope of the disclosure. The operations are described with respect to actions performed by, and data sent between, the AFE 140, ASR component 150, NLU component 160, a skill component 190, and the endpoint (EP) decision component 170.

The operations may begin with the AFE 140 capturing audio and sending (500) audio data to the ASR component 150. The ASR component 150 may perform (502) ASR and endpoint prediction. The ASR component 150 may determine an endpoint score associated with a potential endpoint. The ASR component 150 may send (504) the endpoint score to the EP decision component 170. The EP decision component 170 may determine (504) whether the potential endpoint represents a final endpoint; for example, by determining whether endpoint score satisfies certain conditions. For example, if the endpoint score is below a threshold ("no" at 506), the EP decision component 170 may allow the ASR and endpoint prediction of the incoming audio data stream to continue. If the endpoint score exceeds the threshold ("yes" at 506), the EP decision component 170 may send (508) a stop capture command; for example, to the AFE 140, which may cause the AFE 140 to close the microphone, and/or to the ASR component 150, which may cause the ASR component 150 to stop transcribing audio data.

Upon detecting a potential endpoint, the ASR component may publish (510) ASR results and send (512) the ASR results to downstream components including the NLU component 160 and the endpoint decision component 170. The ASR component 150 may, however, continue to process audio data received from the AFE 140 (e.g., by returning to the stage 502 and/or advancing to the stage 542 shown in FIG. 5B). The endpoint decision component 170 may determine (514), based on the ASR results and the endpoint score received from ASR component 150, whether the potential endpoint represents a final endpoint. If the endpoint decision component 170 determines that the potential endpoint represents a final endpoint ("Yes" at 514), the endpoint decision component 170 may end (516) audio capture and/or processing by the other components. The ASR component 150 may determine (518) that the EP decision component 170 has sent an end capture command (e.g., at the stage 508). If the ASR component 150 has not received an end capture command ("No" at 518), the operations may return to a stage 502. If the ASR component 150 has received an end capture command ("Yes" at 518), the ASR component 150 may stop (520) processing audio and transcribing speech. If the endpoint decision component 170 determines that the potential endpoint does not represent a final endpoint ("No" at 514), audio capture and processing may continue.

In some implementations, the system 100 may update its listening state based on the determination of potential endpoints and/or final endpoints. For example, when the AFE 140 receives an indication to begin receiving audio and generating audio data, the device 110 may enter a listening state. When the system 100 determines a potential endpoint, the system 100 may output an indication that it is in a listening state and a processing state; that is, the system 100 is still capturing audio while also processing speech already received. Thus, the system 100 may initiate steps to answer a question and/or execute a command, but may keep processing subsequent speech until a final endpoint decision has been made. Following a final endpoint decision (for example, a "yes" determination at the decision block 506, 514, etc.), the system 100 may output an indication that it is in a processing state, or an idle state if processing is complete.

The NLU component 160 may receive the ASR results and perform (522) NLU including, in some cases, entity resolution (ER). The NLU component 160 may send (524) NLU output data 524 to a skill component 190, which may correspond to, for example, an intent represented in the NLU output data. The NLU component 160 may also send (524) the NLU output data to the endpoint decision component 170. The endpoint decision component 170 may determine (528) (e.g., based on the NLU output data, the ASR results, and/or the endpoint score) whether the potential endpoint likely represents a final endpoint and, if so ("Yes" at 528), ending (530) audio capture and/or processing. If the EP decision component 170 determines that the potential endpoint does not represent a final endpoint ("No" at 528), the EP decision component 170 may allow capture and processing to continue. For example, the NLU output data may indicate a null case (e.g., no expressed intent), or indicate that one or more entities could not be resolved. Such indications may weigh against determining that the endpoint is final. In contrast, if the NLU output data includes intent and/or entity data with relatively high confidence, such indications may weigh towards a determination that the endpoint is final.

Although the operations in FIG. 5A show the determinations 506, 514, and 528 as three separate and sequential determinations, the EP decision component 170 can process various inputs, alone or in combination, at any time. For example, the EP decision component 170 may receive potential endpoints, ASR results, NLU output, skill output, etc., at various points in time, and make final endpoint determinations at any time based on the most recently received data, a portion of previously received data corresponding to the utterance/dialog, or all data corresponding to that utterance/dialog received up to that point. Thus, the EP decision component 170 may render a final endpoint decision at 506 without waiting for ASR results, at 514 without waiting for NLU output, at 528 without waiting for a skill output, etc.

The operations may continue in FIG. 5B with the skill component 190 receiving (532) the NLU output data. The skill component 190 may initiate (534) command execution by, for example, preparing a plan for executing the request or command represented in the user's speech, retrieving user-specific data or other data related to the command, and/or performing preliminary processing that may allow for quick execution of the command (e.g., once a final endpoint decision has been made). In some implementations, the skill component 190 may execute a command represented in the NLU output data if possible. For example, if the NLU output data includes the <PlayMusic> intent, the skill component 190 may begin playing music from a default or random playlist until and unless the NLU output data is superseded by additional NLU output data. In some implementations, the skill component 190 may not execute the command until it receives an indication of a final endpoint decision from the EP decision component 170. Thus, while the skill component 190 prepares to execute the command, the AFE 140 may continue sending (540) audio data to the ASR component 150. The ASR component may continue performing (542) ASR and/or endpoint prediction. (Individual steps and determinations of stage 542 may be similar to the stages 502-510, but have been combined for clarity.) The ASR component 150 may send (544) additional ASR results to the NLU component 160. The NLU component 160 may continue performing (546) NLU and/or entity resolution (which may be similar to the stage 522). The NLU component 160 may send (548) additional NLU output data to the skill component 190. The additional NLU output data may supersede previous NLU output data sent to the skill component 190. That is, the additional NLU output data may be associated with an utterance and/or dialog identifier that may indicate to the skill component 190 that the additional NLU output data may include additional and/or refined data regarding an intent and/or entity represented in the utterance, and may thus replace the previously received NLU output data. For example, the additional NLU output data may include the <PlayMusic> intent plus an entity representing <SongName>.

The EP decision component 170 may also receive the ASR results data sent at the stage 544 and the NLU output data sent at the stage 548. The EP decision component 170 may, at the decision block 554, make a final endpoint decision based on the additional ASR results and/or NLU output data, as well as any additional potential endpoint predictions made by the ASR component 150. If the EP decision component 170 determines that a final endpoint has not been reached ("No" at 554), the operations may return to the stage 540, and the system 100 may continue to receive and process audio. If the EP decision component 170 determines that a final endpoint has been reached ("Yes" at 554), the EP decision component 170 may send (556) a notification to the skill component 190 that a final endpoint has been reached. The skill component 190 may, in response to the notification, execute (560) the command, including by executing the plan previously initiated. The EP decision component 170 may send (558) a notification to the AFE 140 to stop capturing audio. The AFE 140 may then enter an idle state until it receives a subsequent indication to capture audio again. The system 100, in response to the final endpoint decision, may enter a processing state, where an indication is output to the user that the system 100 is no longer listening, but is still processing the speech. In some implementations, the skill component 190 may return (562) a result of the command execution to the EP decision component 170. The skill result may indicate that a command was or was not successfully executed based on the NLU output data and/or the final endpoint decision. In some implementations, the EP decision component 170 may use the skill results to refine the endpoint decision model 472 and/or or update data used by the endpoint decision model 472, such as the user data 450, the dialog state (e.g., as stored in in the dialog state storage 474), etc. The system 100, in response to the skill results, may change a listening state of the system to an idle state, to indicate to the user that the system 100 is neither listening nor currently processing speech. The operations of FIGS. 5A and 5B may repeat if new speech is received.

FIGS. 6A through 6C illustrate examples of indicators indicating different listening modes of a device 110, according to embodiments of the present disclosure. The user device 110 may include one or more visual indicators 112. The visual indicators 112 may be, for example, a light ring made up of LEDs or other light emitting devices. Different colors may be output via the visual indicators 112 depending upon the message to be communicated. For example, the visual indicators 112 may emit a green light to indicate a listening state. In another example, the visual indicators 112 may emit a blue light to indicate a listening/processing state. In another example, the visual indicators 112 may emit no light to indicate an idle state. It should also be appreciated that the visual indicators 112 may emit different shades of a single color to communicate different messages. For example, the visual indicators 112 in FIG. 6A may output a dark shade of a color to represent a first message, the visual indicators 112 in FIG. 6B may output a medium shade of a color to represent a second message, and the visual indicators 112 in FIG. 6C may output a light shade of a color to represent a third message. While three shades are illustrated, one skilled in the art should appreciate that more or less than three shades of a color may be implemented depending upon how many different messages are to be communicated. Further, while the visual indicator 112 examples of FIGS. 6A through 6C may be static, they may also appear to move in some manner. For example, the visual indicators may blink, strobe, or continuously move around/along a surface of the device 110. The visual indicators 112 may output light colors and/or patterns to indicate various listening states such as active listening, passive listening, idle, hibernating, etc. Different listening states may correspond to different light patterns; for example, different colors, different patterns of flashing or movement of light, etc. In some implementations, the user device 110 may provide access to more than one virtual assistant system. In such cases, the visual indicators 112 may additionally indicate which virtual assistant is currently active.

Figure 7:
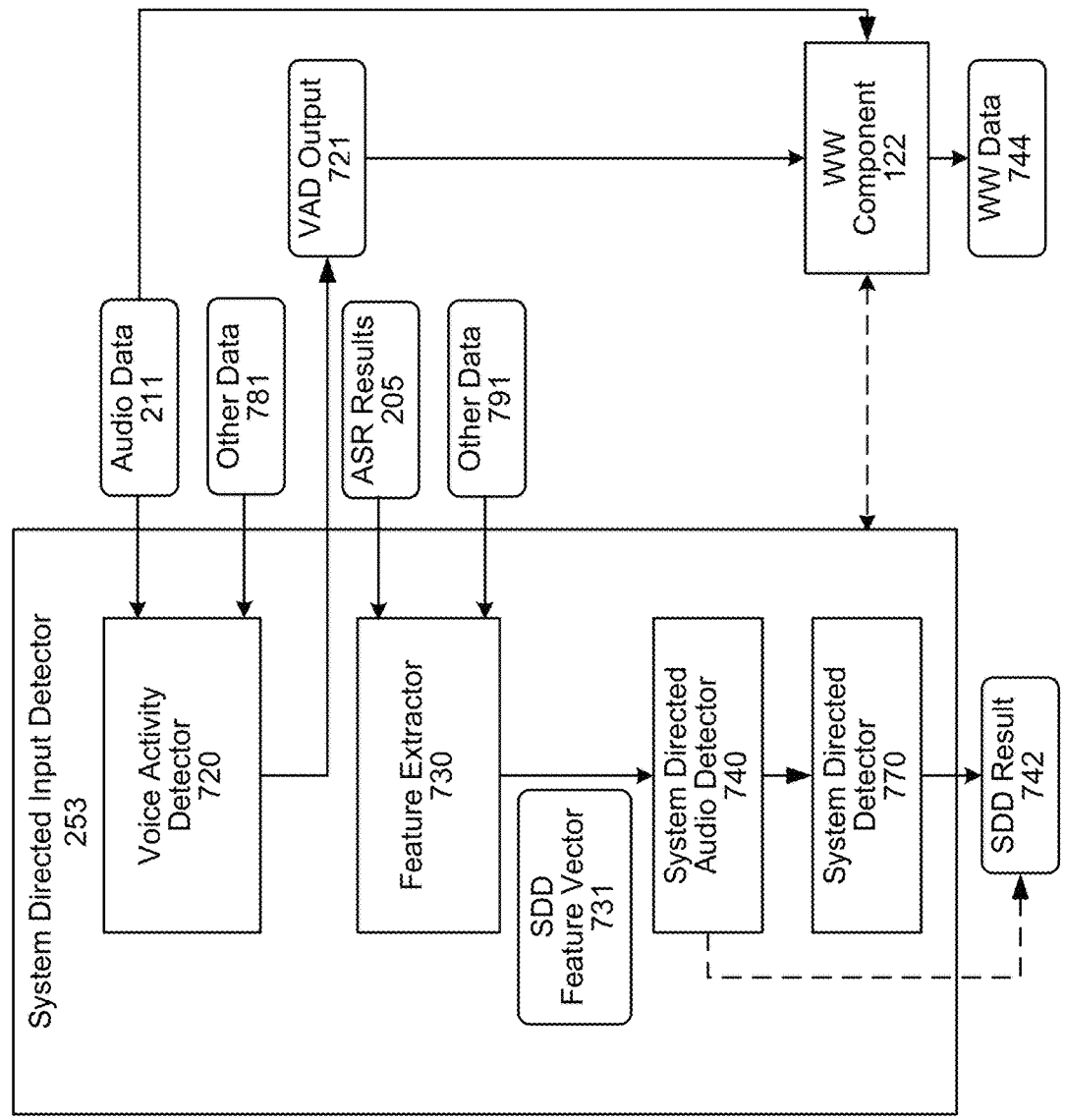
FIG. 7 is a conceptual diagram of components of a system to detect if input audio data includes system directed speech, according to embodiments of the present disclosure.

FIG. 7 is a conceptual diagram of components of a system to detect if input audio data includes system directed speech, according to embodiments of the present disclosure. In some implementations, the SDD 253 may be included in the end-to-end ASR model employed by the ASR component 150. In some implementations, the SDD 253 may be a standalone system. In any case, operation of the SDD may be similar. Output of the SDD 253 may include SDD prediction data, which may be included in ASR results and/or received as an input to the endpoint decision component 170.

Configuration and operation of the SDD 253 is illustrated in FIG. 7. As shown in FIG. 7, the SDD 253 may include a number of different components. First, the SDD 253 may include a voice activity detector (VAD) 720. The VAD 720 may operate to detect whether the incoming audio data 211 includes speech or not. The VAD output 721 may be a binary indicator. Thus, if the incoming audio data 211 includes speech, the VAD 720 may output an indicator 721 that the audio data 211 does includes speech (e.g., a 1) and if the incoming audio data 211 does not includes speech, the VAD 720 may output an indicator 721 that the audio data 211 does not includes speech (e.g., a 0). The VAD output 721 may also be a score (e.g., a number between 0 and 1) corresponding to a likelihood that the audio data 211 includes speech. The VAD 720 may also perform start-point detection as well as endpoint detection where the VAD 720 determines when speech starts in the audio data 211 and when it ends in the audio data 211. Thus the VAD output 721 may also include indicators of a speech start point and/or a speech endpoint for use by other components of the system. (For example, the start-point and endpoints may demarcate the audio data 211 that is sent to the speech processing component 240.) The VAD output 721 may be associated with a same unique ID as the audio data 211 for purposes of tracking system processing across various components.

The VAD 720 may operate using a variety of VAD techniques, including those described above with regard to VAD operations performed by device 110. The VAD may be configured to be robust to background noise so as to accurately detect when audio data actually includes speech or not. The VAD 720 may operate on raw audio data 211 such as that sent by device 110 or may operate on feature vectors or other data representing the audio data 211. For example, the VAD 720 may take the form of a deep neural network (DNN) and may operate on a single feature vector representing the entirety of audio data 211 received from the device or may operate on multiple feature vectors, for example feature vectors representing frames of audio data where each frame covers a certain amount of time of audio data (e.g., 25 ms). The VAD 720 may also operate on other data 781 that may be useful in detecting voice activity in the audio data 211. For example, the other data 781 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 211 to determine if that voice matches a voice in the reference section of speech. If the voices match, that may be an indicator to the VAD 720 that speech was detected. If not, that may be an indicator to the VAD 720 that speech was not detected. (For example, a representation may be taken of voice data in the first input audio data which may then be compared to the second input audio data to see if the voices match. If they do (or do not) that information may be considered by the VAD 720.) The VAD 720 may also consider other data when determining if speech was detected. The VAD 720 may also consider speaker ID information (such as may be output by SID component 254), directionality data that may indicate what direction (relative to the user device 110) the incoming audio was received from. Such directionality data may be received from the device 110 and may have been determined by a beamformer or other component of device 110. The VAD 720 may also consider data regarding a previous utterance which may indicate whether the further audio data received by the system is likely to include speech. Other VAD techniques may also be used.

If the VAD output 721 indicates that no speech was detected the system may discontinue processing with regard to the audio data 211, thus saving computing resources that might otherwise have been spent on other processes (e.g., ASR for the audio data 211, etc.). If the VAD output 721 indicates that speech was detected, the system may make a determination as to whether the speech was or was not directed to the speech-processing system. Such a determination may be made by the system directed audio detector 740. The system directed audio detector 740 may include a trained model, such as a DNN, that operates on a feature vector which represent certain data that may be useful in determining whether or not speech is directed to the system. To create the feature vector operable by the system directed audio detector 740, a feature extractor 730 may be used. The feature extractor 730 may input ASR results 205 which include results from the processing of the audio data 211 by the ASR component 150. For privacy protection purposes, in certain configurations the ASR results 205 may be obtained from an ASR component 150 located on device 110 or on a home remote component as opposed to a language processing component/ASR component 150 located on a cloud or other remote system 120 so that audio data 211 is not sent remote from the user's home unless the SDD 253 has determined that the input is system directed. Though this may be adjusted depending on user preferences/system configuration.

The ASR results 205 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 205 may include a trellis, which may include a raw search graph as scored during ASR decoding. The ASR results 205 may also include a lattice, which may be a trellis as scored that has been pruned to remove certain hypotheses that do not exceed a score threshold or number of hypotheses threshold. The ASR results 205 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 205 may also include corresponding respective scores (such as for a trellis, lattice, confusion network, individual hypothesis, N-best list, etc.)

The ASR results 205 (or other data 791) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 150 being less confident about its best hypothesis, which in turn may correlate to detected speech not being device directed. The entropy may be a feature included in other data 791 to be considered by the system directed audio detector 740.

The system may also determine and consider ASR decoding costs, which may include features from Viterbi decoding costs of the ASR. Such features may indicate how well the input acoustics and vocabulary match with, for example, an acoustic model and/or a language model. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 150 is less confident about the top hypothesis, which may correlate to detected speech not being device directed. Other such features or data from the ASR results 205 may also be used as other data 791.

The ASR results 205 may be represented in a system directed detector (SDD) feature vector 731 that can be used to determine whether speech was system-directed. The feature vector 731 may represent the ASR results 205 but may also represent audio data 211 (which may be input to feature extractor 730) or other information. Such ASR results may be helpful in determining if speech was system-directed. For example, if ASR results include a high scoring single hypothesis, that may indicate that the speech represented in the audio data 211 is directed at, and intended for, the device 110. If, however, ASR results do not include a single high scoring hypothesis, but rather many lower scoring hypotheses, that may indicate some confusion on the part of the ASR component 150 and may also indicate that the speech represented in the audio data 211 was not directed at, nor intended for, the device 110.

The ASR results 205 may include complete ASR results, for example ASR results corresponding to all speech between a startpoint and endpoint (such as a complete lattice, etc.). In this configuration the system may wait until all ASR processing for a certain input audio has been completed before operating the feature extractor 730 and system directed audio detector 740. Thus the system directed audio detector 740 may receive a feature vector 731 that includes all the representations of the audio data 211 created by the feature extractor 730. The system directed audio detector 740 may then operate a trained model (such as a DNN) on the feature vector 731 to determine a score corresponding to a likelihood that the audio data 211 includes a representation of system-directed speech. If the score is above a threshold, the system directed audio detector 740 may determine that the audio data 211 does include a representation of system-directed speech. The SDD result 742 may include an indicator of whether the audio data 742 includes system-directed speech, a score, and/or some other data.

The ASR results 205 may also include incomplete ASR results, for example ASR results corresponding to only some speech between a between a startpoint and endpoint (such as an incomplete lattice, etc.). In this configuration the feature extractor 730/system directed audio detector 740 may be configured to operate on incomplete ASR results 205 and thus the system directed audio detector 740 may be configured to output an SSD result 742 that provides an indication as to whether the portion of audio data processed (that corresponds to the incomplete ASR results) corresponds to system directed speech. The system may thus be configured to perform ASR at least partially in parallel with the system directed audio detector 740 to process ASR result data as it is ready and thus continually update an SDD result 742. Once the SDD 253 has processed enough ASR results and/or the SDD result 742 exceeds a threshold, the system may determine that the audio data 211 includes system-directed speech. Similarly, once the SDD 253 has processed enough ASR results and/or the SDD result 742 drops below another threshold, the system may determine that the audio data 211 does not include system-directed speech.

The SDD result 742 may be associated with a same unique ID as the audio data 211 and VAD output 721 for purposes of tracking system processing across various components.

The feature extractor 730 may also incorporate in a feature vector 731 representations of other data 791. Other data 791 may include, for example, word embeddings from words output by the ASR component 150 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 730 processing and representing a word embedding in a feature vector 731 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 791 may also include, for example, NLU output from the NLU component 160 may be considered. Thus, if natural language output data 985/425 indicates a high correlation between the audio data 211 and an out-of-domain indication (e.g., no intent classifier scores from ICs 964 or overall domain scores from recognizers 963 reach a certain confidence threshold), this may indicate that the audio data 211 does not include system-directed speech. Other data 791 may also include, for example, an indicator of a user/speaker as output SID component 254. Thus, for example, if the SID component 254 does not indicate the presence of a known user, or indicates the presence of a user associated with audio data 211 that was not associated with a previous utterance, this may indicate that the audio data 211 does not include system-directed speech. The other data 791 may also include an indication that a voice represented in audio data 211 is the same (or different) as the voice detected in previous input audio data corresponding to a previous utterance. The other data 791 may also include directionality data, for example using beamforming or other audio processing techniques to determine a direction/location of a source of detected speech and whether that source direction/location matches a speaking user. The other data 791 may also include data indicating that a direction of a user's speech is toward a device 110 or away from a device 110, which may indicate whether the speech was system directed or not.

Other data 791 may also dialog history data. For example, the other data 791 may include information about whether a speaker has changed from a previous utterance to the current audio data 211, whether a topic of conversation has changed from a previous utterance to the current audio data, how NLU results from a previous utterance compare to NLU results obtained using the current audio data 211, other system context information. The other data 791 may also include an indicator as to whether the audio data 211 was received as a result of a wake command or whether the audio data 211 was sent without the device 110 detecting a wake command (e.g., the device 110 being instructed by remote system 120 and/or determining to send the audio data without first detecting a wake command).

Other data 791 may also include information from a user profile. Other data 791 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 791 may also include acoustic feature data such as pitch, prosody, intonation, volume, or other data descriptive of the speech in the audio data 211. As a user may use a different vocal tone to speak with a machine than with another human, acoustic feature information may be useful in determining if speech is device-directed.

Other data 791 may also include an indicator that indicates whether the audio data 211 includes a wakeword. For example, if a device 110 detects a wakeword prior to sending the audio data 211 to the remote system 120, the device 110 may send along an indicator that the device 110 detected a wakeword in the audio data 211. In another example, the remote system 120 may include another component that processes incoming audio data 211 to determine if it includes a wakeword. If it does, the component may create an indicator indicating that the audio data 211 includes a wakeword. The indicator may then be included in other data 791 to be incorporated in the feature vector 731 and/or otherwise considered by the system directed audio detector 740.

Other data 791 may also include device history data such as information about previous operations related to the device 110 that sent the audio data 211. For example, the other data 791 may include information about a previous utterance that was just executed, where the utterance originated with the same device 110 as a current utterance and the previous utterance was within a certain time window of the current utterance. Device history data may be stored in a manner associated with the device identifier (which may also be included in other data 791), which may also be used to track other information about the device, such as device hardware, capability, location, etc.

The other data 781 used by the VAD 720 may include similar data and/or different data from the other data 791 used by the feature extractor 730. The other data 781/791 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 740 and/or the VAD 720) may be based on the data from the previous utterance. For example, a score threshold (for the system directed audio detector 740 and/or the VAD 720) may be based on acoustic data from a previous utterance.

The feature extractor 730 may output a single feature vector 731 for one utterance/instance of input audio data 211. The feature vector 731 may consistently be a fixed length, or may be a variable length vector depending on the relevant data available for particular audio data 211. Thus, the system directed audio detector 740 may output a single SDD result 742 per utterance/instance of input audio data 211. The SDD result 742 may be a binary indicator. Thus, if the incoming audio data 211 includes system-directed speech, the system directed audio detector 740 may output an indicator 742 that the audio data 211 does includes system-directed speech (e.g., a 1) and if the incoming audio data 211 does not includes system-directed speech, the system directed audio detector 740 may output an indicator 742 that the audio data 211 does not system-directed includes speech (e.g., a 0). The SDD result 742 may also be a score (e.g., a number between 0 and 1) corresponding to a likelihood that the audio data 211 includes system-directed speech. Although not illustrated in FIG. 7, the flow of data to and from the SDD 253 may be managed by an orchestrator component or by one or more other components.

The trained model(s) of the system directed audio detector 740 may be trained on many different examples of SDD feature vectors that include both positive and negative training samples (e.g., samples that both represent system-directed speech and non-system directed speech) so that the DNN and/or other trained model of the system directed audio detector 740 may be capable of robustly detecting when speech is system-directed versus when speech is not system-directed.

A further input to the SDD 253 may include output data a TTS component 178 to avoid synthesized speech output by the system being confused as system-directed speech spoken by a user. The output from the TTS component 178 may allow the system to ignore synthesized speech in its considerations of whether speech was system directed. The output from the TTS component 178 may also allow the system to determine whether a user captured utterance is responsive to the TTS output, thus improving system operation.

The SDD 253 may also use echo return loss enhancement (ERLE) and/or acoustic echo cancellation (AEC) data to avoid processing of audio data generated by the system.

The SDD 253 may also receive information from a wakeword detection component 122. For example, an indication that a wakeword was detected (e.g., WW data 744) may be considered by the SDD 253 (e.g., by system directed audio detector 740, system directed detector 770, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing components such as an ASR component 150 and/or NLU component 160). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 211) sent to a remote system 120 that is outside a user's home or other direct control.

Figure 8:
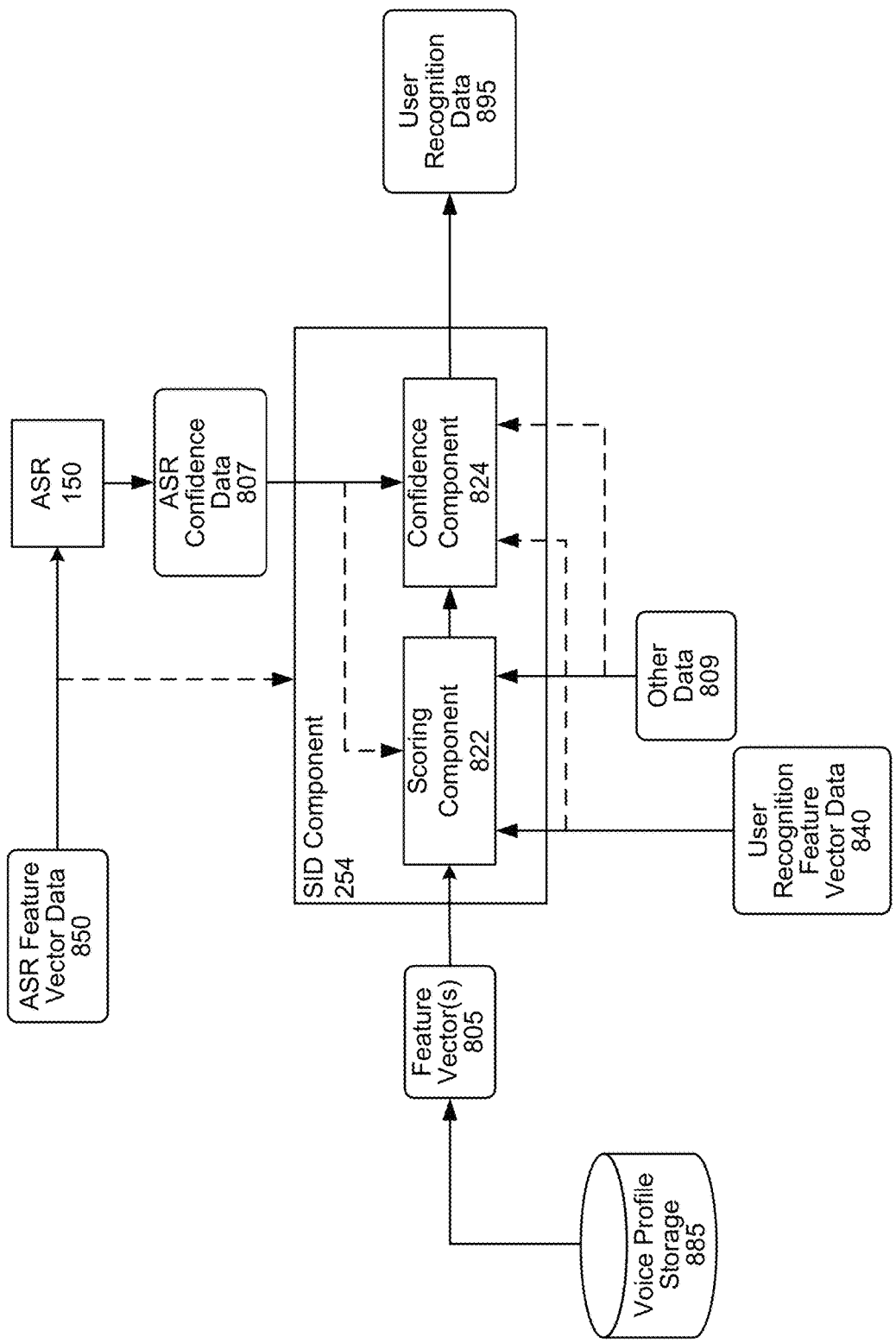
FIG. 8 is a system flow diagram illustrating user recognition according to embodiments of the present disclosure.

FIG. 8 is a system flow diagram illustrating user recognition according to embodiments of the present disclosure. FIG. 8 illustrates user recognition processing as may be performed by the SID component 254. In some implementations, the SID component 254 may be included in the end-to-end ASR model employed by the ASR component 150. In some implementations, the SID component 254 may be a standalone system. In any case, operation of the SID component 254 may be similar. Output of the SID component 254 may include user recognition data 895 (e.g., a speaker identifier), which may be included in ASR results and/or received as an input to the endpoint decision component 170.

The SID component 254 may perform speaker identification using various data including the user recognition feature vector data 840, feature vectors 805 representing voice profiles of users of the system 100, ASR feature vector data 850, the ASR confidence data 807, and other data 809. The SID component 254 may output the user recognition data 895, which reflects a certain confidence that the user input was spoken by one or more particular users. The user recognition data 895 may include one or more user identifiers (e.g., corresponding to one or more voice profiles). Each user identifier in the user recognition data 895 may be associated with a respective confidence value, representing a likelihood that the user input corresponds to the user identifier. A confidence value may be a numeric or binned value.

The feature vector(s) 805 input to the SID component 254 may correspond to one or more voice profiles. The SID component 254 may use the feature vector(s) 805 to compare against the user recognition feature vector 840, representing the present user input, to determine whether the user recognition feature vector 840 corresponds to one or more of the feature vectors 805 of the voice profiles. Each feature vector 805 may be the same size as the user recognition feature vector 840.

To perform user recognition, the SID component 254 may determine the device 110 from which the audio data 211 originated. For example, the audio data 211 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 840 produced from the audio data 211. The SID component 254 may send a signal to voice profile storage 885, with the signal requesting only audio data and/or feature vectors 805 (depending on whether audio data and/or corresponding feature vectors are stored) associated with the device identifier, the group profile identifier, and/or the user identifiers represented in the metadata. This limits the universe of possible feature vectors 805 the SID component 254 considers at runtime and thus decreases the amount of time to perform user recognition processing by decreasing the amount of feature vectors 805 needed to be processed. Alternatively, the SID component 254 may access all (or some other subset of) the audio data and/or feature vectors 805 available to the SID component 254. However, accessing all audio data and/or feature vectors 805 will likely increase the amount of time needed to perform user recognition processing based on the magnitude of audio data and/or feature vectors 805 to be processed.

If the SID component 254 receives audio data from the voice profile storage 885, the SID component 254 may generate one or more feature vectors 805 corresponding to the received audio data.

The SID component 254 may attempt to identify the user that spoke the speech represented in the audio data 211 by comparing the user recognition feature vector 840 to the feature vector(s) 805. The SID component 254 may include a scoring component 822 that determines respective scores indicating whether the user input (represented by the user recognition feature vector 840) was spoken by one or more particular users (represented by the feature vector(s) 805). The SID component 254 may also include a confidence component 824 that determines an overall accuracy of user recognition processing (such as those of the scoring component 822) and/or an individual confidence value with respect to each user potentially identified by the scoring component 822. The output from the scoring component 822 may include a different confidence value for each received feature vector 805. For example, the output may include a first confidence value for a first feature vector 805a (representing a first voice profile), a second confidence value for a second feature vector 805b (representing a second voice profile), etc. Although illustrated as two separate components, the scoring component 822 and the confidence component 824 may be combined into a single component or may be separated into more than two components.

The scoring component 822 and the confidence component 824 may implement one or more trained machine learning models (such as neural networks, classifiers, etc.) as known in the art. For example, the scoring component 822 may use probabilistic linear discriminant analysis (PLDA) techniques. PLDA scoring determines how likely it is that the user recognition feature vector 840 corresponds to a particular feature vector 805. The PLDA scoring may generate a confidence value for each feature vector 805 considered and may output a list of confidence values associated with respective user identifiers. The scoring component 822 may also use other techniques, such as GMMs, generative Bayesian models, or the like, to determine confidence values.

The confidence component 824 may input various data including information about the ASR confidence 807, speech length (e.g., number of frames or other measured length of the user input), audio condition/quality data (such as signal-to-interference data or other metric data), fingerprint data, image data, or other factors to consider how confident the SID component 254 is with regard to the confidence values linking users to the user input. The confidence component 824 may also consider the confidence values and associated identifiers output by the scoring component 822. For example, the confidence component 824 may determine that a lower ASR confidence 807, or poor audio quality, or other factors, may result in a lower confidence of the SID component 254. Whereas a higher ASR confidence 807, or better audio quality, or other factors, may result in a higher confidence of the SID component 254.

Precise determination of the confidence may depend on configuration and training of the confidence component 824 and the model(s) implemented thereby. The confidence component 824 may operate using a number of different machine learning models/techniques such as GMM, neural networks, etc. For example, the confidence component 824 may be a classifier configured to map a score output by the scoring component 822 to a confidence value.

The SID component 254 may output user recognition data 895 specific to a one or more user identifiers. For example, the SID component 254 may output user recognition data 895 with respect to each received feature vector 805. The user recognition data 895 may include numeric confidence values (e.g., 0.0-1.0, 0-1000, or whatever scale the system is configured to operate). Thus, the user recognition data 895 may output an n-best list of potential users with numeric confidence values (e.g., user identifier 123—0.2, user identifier 234—0.8). Alternatively or in addition, the user recognition data 895 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The SID component 254 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 895 may only include information related to the top scoring identifier as determined by the SID component 254. The SID component 254 may also output an overall confidence value that the individual confidence values are correct, where the overall confidence value indicates how confident the SID component 254 is in the output results. The confidence component 824 may determine the overall confidence value.

The confidence component 824 may determine differences between individual confidence values when determining the user recognition data 895. For example, if a difference between a first confidence value and a second confidence value is large, and the first confidence value is above a threshold confidence value, then the SID component 254 is able to recognize a first user (associated with the feature vector 805 associated with the first confidence value) as the user that spoke the user input with a higher confidence than if the difference between the confidence values were smaller.

The SID component 254 may perform thresholding to avoid incorrect user recognition data 895 being output. For example, the SID component 254 may compare a confidence value output by the confidence component 824 to a threshold confidence value. If the confidence value does not satisfy (e.g., does not meet or exceed) the threshold confidence value, the SID component 254 may not output user recognition data 895, or may only include in that data 895 an indicator that a user that spoke the user input could not be recognized. Further, the SID component 254 may not output user recognition data 895 until enough user recognition feature vector data 840 is accumulated and processed to verify a user above a threshold confidence value. Thus, the SID component 254 may wait until a sufficient threshold quantity of audio data of the user input has been processed before outputting user recognition data 895. The quantity of received audio data may also be considered by the confidence component 824.

The SID component 254 may be defaulted to output binned (e.g., low, medium, high) user recognition confidence values. However, such may be problematic in certain situations. For example, if the SID component 254 computes a single binned confidence value for multiple feature vectors 805, the system may not be able to determine which particular user originated the user input. In this situation, the SID component 254 may override its default setting and output numeric confidence values. This enables the system to determine a user, associated with the highest numeric confidence value, originated the user input.

The SID component 254 may use other data 809 to inform user recognition processing. A trained model(s) or other component of the SID component 254 may be trained to take other data 809 as an input feature when performing user recognition processing. Other data 809 may include a variety of data types depending on system configuration and may be made available from other sensors, devices, or storage. The other data 809 may include a time of day at which the audio data 211 was generated by the device 110 or received from the device 110, a day of a week in which the audio data audio data 211 was generated by the device 110 or received from the device 110, etc.

The other data 809 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 809 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 809 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 809 may include data representing activity of a particular user that may be useful in performing user recognition processing. For example, a user may have recently entered a code to disable a home security alarm. A device 110, represented in a group profile associated with the home, may have generated the audio data 211. The other data 809 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 809 and considered by the SID component 254.

Depending on system configuration, the other data 809 may be configured to be included in the user recognition feature vector data 840 so that all the data relating to the user input to be processed by the scoring component 822 may be included in a single feature vector. Alternatively, the other data 809 may be reflected in one or more different data structures to be processed by the scoring component 822.

Figure 9:
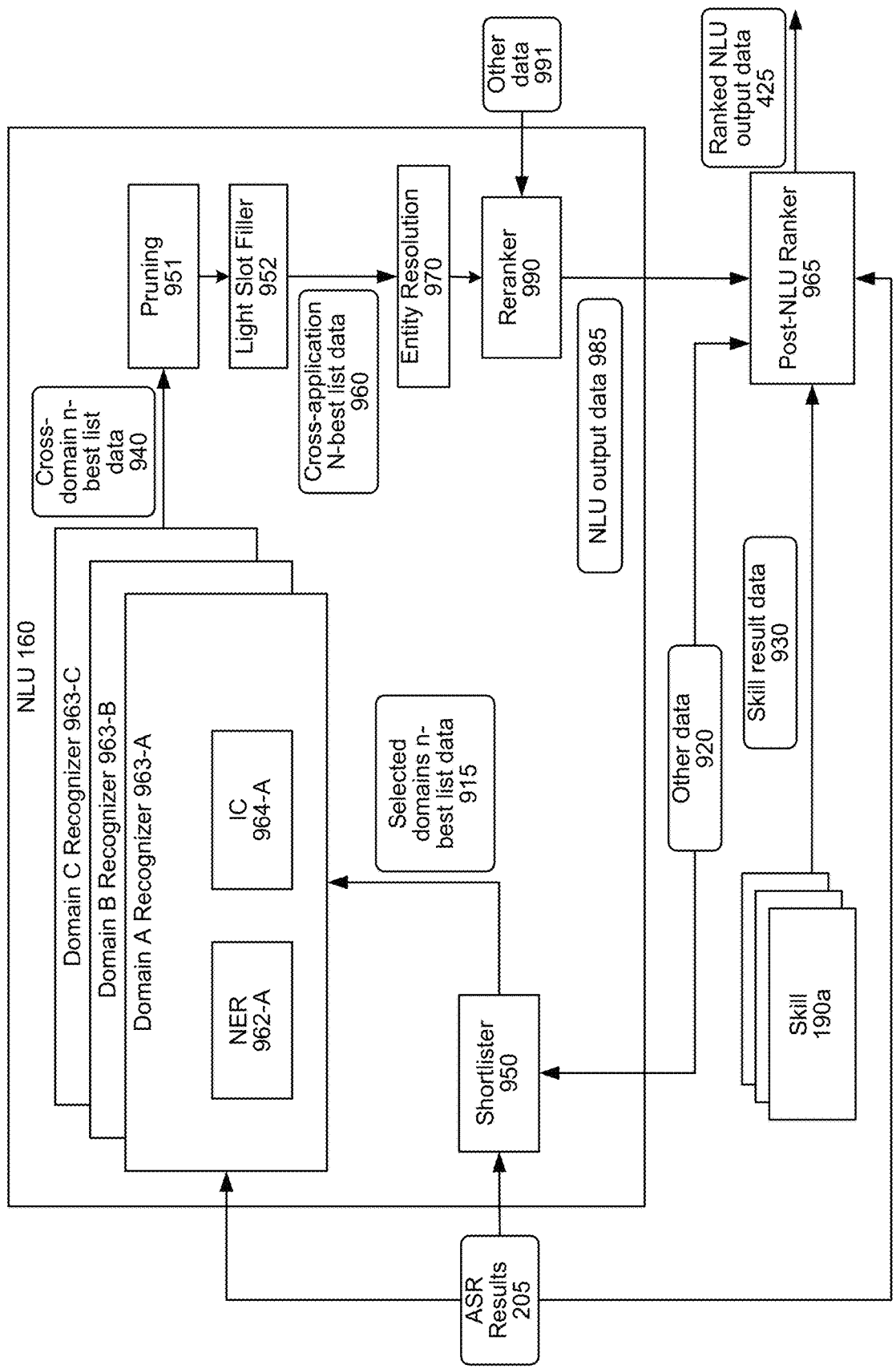
FIG. 9 is a conceptual diagram of how natural language processing is performed, according to embodiments of the present disclosure.

FIG. 9 is a conceptual diagram of how natural language processing is performed, according to embodiments of the present disclosure. The NLU component 160 may process text data including several ASR hypotheses of a single user input. For example, if the ASR component 150 outputs text data including an n-best list of ASR hypotheses, the NLU component 160 may process the text data with respect to all (or a portion of) the ASR hypotheses represented therein.

The NLU component 160 may annotate text data by parsing and/or tagging the text data. For example, for the text data "tell me the weather for Seattle," the NLU component 160 may tag "tell me the weather for Seattle" as an <OutputWeather> intent as well as separately tag "Seattle" as a location for the weather information.

The NLU component 160 may include a shortlister component 950. The shortlister component 950 selects skills that may execute with respect to ASR results 205 input to the NLU component 160 (e.g., applications that may execute with respect to the user input). The ASR results 205 (which may also be referred to as ASR results 205) may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 160 may process ASR results 205 input thereto with respect to every skill of the system, either in parallel, in series, or using some combination thereof. By implementing a shortlister component 950, the NLU component 160 may process ASR results 205 with respect to only the skills that may execute with respect to the user input. This reduces total compute power and latency attributed to NLU processing.

The shortlister component 950 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR results 205 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 160 may include one or more recognizers 963. In at least some embodiments, a recognizer 963 may be associated with a skill support system 125 (e.g., the recognizer may be configured to interpret text data to correspond to the skill support system 125). In at least some other examples, a recognizer 963 may be associated with a domain such as smart home, video, music, weather, custom, etc. (e.g., the recognizer may be configured to interpret text data to correspond to the domain).

If the shortlister component 950 determines ASR results 205 is potentially associated with multiple domains, the recognizers 963 associated with the domains may process the ASR results 205, while recognizers 963 not indicated in the shortlister component 950's output may not process the ASR results 205. The "shortlisted" recognizers 963 may process the ASR results 205 in parallel, in series, partially in parallel, etc. For example, if ASR results 205 potentially relates to both a communications domain and a music domain, a recognizer associated with the communications domain may process the ASR results 205 in parallel, or partially in parallel, with a recognizer associated with the music domain processing the ASR results 205.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 160) may also determine whether a word refers to an entity whose identity is not explicitly mentioned in the text data, for example "him," "her," "it" or other anaphora, exophora, or the like.

A downstream process called entity resolution (discussed in detail elsewhere herein) links a slot of text data to a specific entity known to the system. To perform entity resolution, the NLU component 160 may utilize gazetteer information stored in, for example, an entity library storage. The gazetteer information may be used to match text data (representing a portion of the user input) with text data representing known entities, such as song titles, contact names, etc. The gazetteer information may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 974 of words linked to intents. For example, a music intent database may link words and phrases such as "quiet," "volume off," and "mute" to a <Mute> intent. An IC component 964 identifies potential intents by comparing words and phrases in text data (representing at least a portion of the user input) to the words and phrases in an intents database 974 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks with "slots" to be filled. Each slot of a grammar framework corresponds to a portion of text data that the system believes corresponds to an entity. For example, a grammar framework corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model associated with the identified intent. For example, a grammar model for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon (associated with the domain associated with the recognizer 963 implementing the NER component 962), attempting to match words and phrases in text data the NER component 962 previously tagged as a grammatical object or object modifier with those identified in the lexicon.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like. For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a <PlayMusic> intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent}<PlayMusic>, {artist name} rolling stones, {media type} SONG, and {song title} mother's little helper. For further example, the NER component 962 may tag "play songs by the rolling stones" as: {domain} Music, {intent}<PlayMusic>, {artist name} rolling stones, and {media type} SONG.

The shortlister component 950 may receive ASR results 205 output from the ASR component 150 or output from the device 110b (as illustrated in FIG. 9). The ASR component 150 may embed the ASR results 205 into a form processable by a trained model(s) using sentence embedding techniques as known in the art. Sentence embedding results in the ASR results 205 including text in a structure that enables the trained models of the shortlister component 950 to operate on the ASR results 205. For example, an embedding of the ASR results 205 may be a vector representation of the ASR results 205.

The shortlister component 950 may make binary determinations (e.g., yes or no) regarding which domains relate to the ASR results 205. The shortlister component 950 may make such determinations using the one or more trained models described herein above. If the shortlister component 950 implements a single trained model for each domain, the shortlister component 950 may simply run the models that are associated with enabled domains as indicated in a user profile associated with the device 110 and/or user that originated the user input.

The shortlister component 950 may generate n-best list data 915 representing domains that may execute with respect to the user input represented in the ASR results 205. The size of the n-best list represented in the n-best list data 915 is configurable. In an example, the n-best list data 915 may indicate every domain of the system as well as contain an indication, for each domain, regarding whether the domain is likely capable to execute the user input represented in the ASR results 205. In another example, instead of indicating every domain of the system, the n-best list data 915 may only indicate the domains that are likely to be able to execute the user input represented in the ASR results 205. In yet another example, the shortlister component 950 may implement thresholding such that the n-best list data 915 may indicate no more than a maximum number of domains that may execute the user input represented in the ASR results 205. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR results 205 by the shortlister component 950 relative to such domains) are included in the n-best list data 915.

The ASR results 205 may correspond to more than one ASR hypothesis. When this occurs, the shortlister component 950 may output a different n-best list (represented in the n-best list data 915) for each ASR hypothesis. Alternatively, the shortlister component 950 may output a single n-best list representing the domains that are related to the multiple ASR hypotheses represented in the ASR results 205.

As indicated above, the shortlister component 950 may implement thresholding such that an n-best list output therefrom may include no more than a threshold number of entries. If the ASR results 205 includes more than one ASR hypothesis, the n-best list output by the shortlister component 950 may include no more than a threshold number of entries irrespective of the number of ASR hypotheses output by the ASR component 150. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR results 205, the shortlister component 950 may generate confidence scores representing likelihoods that domains relate to the ASR results 205. If the shortlister component 950 implements a different trained model for each domain, the shortlister component 950 may generate a different confidence score for each individual domain trained model that is run. If the shortlister component 950 runs the models of every domain when ASR results 205 is received, the shortlister component 950 may generate a different confidence score for each domain of the system. If the shortlister component 950 runs the models of only the domains that are associated with skills indicated as enabled in a user profile associated with the device 110 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR results 205.

N-best list data 915 including confidence scores that may be output by the shortlister component 950 may be represented as, for example:

Search domain, 0.67
Recipe domain, 0.62
Information domain, 0.57
Shopping domain, 0.42

As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 920 when determining which domains may relate to the user input represented in the ASR results 205 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR results 205, for example as determined by the SID 254.

The other data 920 may be character embedded prior to being input to the shortlister component 950. The other data 920 may alternatively be embedded using other techniques known in the art prior to being input to the shortlister component 950.

The other data 920 may also include data indicating the domains associated with skills that are enabled with respect to the device 110 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage. When the shortlister component 950 receives the ASR results 205, the shortlister component 950 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the device 110 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the device 110 that originated the user input corresponding to the ASR results 205. For example, if the device 110 is a displayless device, the shortlister component 950 may increase the confidence score associated with the domain that generates audio data while leaving the confidence score associated with the domain that generates video data the same. Alternatively, if the device 110 is a displayless device, the shortlister component 950 may leave the confidence score associated with the domain that generates audio data the same while decreasing the confidence score associated with the domain that generates video data. Moreover, if the device 110 is a displayless device, the shortlister component 950 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the system(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 950 as well as the different types of other data 920 considered by the shortlister component 950 are configurable. For example, the shortlister component 950 may update confidence scores as more other data 920 is considered. For further example, the n-best list data 915 may exclude relevant domains if thresholding is implemented. Thus, for example, the shortlister component 950 may include an indication of a domain in the n-best list 915 unless the shortlister component 950 is one hundred percent confident that the domain may not execute the user input represented in the ASR results 205 (e.g., the shortlister component 950 determines a confidence score of zero for the domain).

The shortlister component 950 may send the ASR results 205 to recognizers 963 associated with domains represented in the n-best list data 915. Alternatively, the shortlister component 950 may send the n-best list data 915 or some other indicator of the selected subset of domains to another component (such as an orchestrator component) which may in turn send the ASR results 205 to the recognizers 963 corresponding to the domains included in the n-best list data 915 or otherwise indicated in the indicator. If the shortlister component 950 generates an n-best list representing domains without any associated confidence scores, the shortlister component 950/orchestrator component may send the ASR results 205 to recognizers 963 associated with domains that the shortlister component 950 determines may execute the user input. If the shortlister component 950 generates an n-best list representing domains with associated confidence scores, the shortlister component 950/orchestrator component may send the ASR results 205 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 160 may compile the output tagged text data of the recognizers 963 into a single cross-domain n-best list 940 and may send the cross-domain n-best list 940 to a pruning component 951. Each entry of tagged text (e.g., each NLU hypothesis) represented in the cross-domain n-best list data 940 may be associated with a respective score indicating a likelihood that the NLU hypothesis corresponds to the domain associated with the recognizer 963 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 951 may sort the NLU hypotheses represented in the cross-domain n-best list data 940 according to their respective scores. The pruning component 951 may perform score thresholding with respect to the cross-domain NLU hypotheses. For example, the pruning component 951 may select NLU hypotheses associated with scores satisfying (e.g., meeting and/or exceeding) a threshold score. The pruning component 951 may also or alternatively perform number of NLU hypothesis thresholding. For example, the pruning component 951 may select the top scoring NLU hypothesis(es). The pruning component 951 may output a portion of the NLU hypotheses input thereto. The purpose of the pruning component 951 is to create a reduced list of NLU hypotheses so that downstream, more resource intensive, processes may only operate on the NLU hypotheses that most likely represent the user's intent.

The NLU component 160 may include a light slot filler component 952. The light slot filler component 952 can take text from slots represented in the NLU hypotheses output by the pruning component 951 and alter them to make the text more easily processed by downstream components. The light slot filler component 952 may perform low latency operations that do not involve heavy operations such as reference to a knowledge base (e.g., 972. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 160 may include multiple entity resolution components 970 and each entity resolution component 970 may be specific to one or more domains.

The NLU component 160 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 160 may perform NLU processing described above with respect to domains associated with skills wholly implemented as part of the system 100. The NLU component 160 may separately perform NLU processing described above with respect to domains associated with skills that are at least partially implemented as part of the skill system(s) 125. In an example, the shortlister component 950 may only process with respect to these latter domains. Results of these two NLU processing paths may be merged into NLU output data 985, which may be sent to a post-NLU ranker 965, which may be implemented by the system(s) 120.

The post-NLU ranker 965 may include a statistical component that produces a ranked list of intent/skill pairs with associated confidence scores. Each confidence score may indicate an adequacy of the skill's execution of the intent with respect to NLU results data associated with the skill. The post-NLU ranker 965 may operate one or more trained models configured to process the NLU results data 985, skill result data 930, and the other data 920 in order to output ranked NLU output data 425. The ranked NLU output data 425 may include an n-best list where the NLU hypotheses in the NLU results data 985 are reordered such that the n-best list in the ranked NLU output data 425 represents a prioritized list of skills to respond to a user input as determined by the post-NLU ranker 965. The ranked NLU output data 425 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 965 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 965 (or other scheduling component such as an orchestrator component) may solicit the first skill and the second skill to provide potential result data 930 based on the first NLU hypothesis and the second NLU hypothesis, respectively. For example, the post-NLU ranker 965 may send the first NLU hypothesis to the first skill component 190a along with a request for the first skill component 190a to at least partially execute with respect to the first NLU hypothesis. The post-NLU ranker 965 may also send the second NLU hypothesis to the second skill component 190b along with a request for the second skill component 190b to at least partially execute with respect to the second NLU hypothesis. The post-NLU ranker 965 receives, from the first skill component 190a, first result data 930a generated from the first skill component 190a's execution with respect to the first NLU hypothesis. The post-NLU ranker 965 also receives, from the second skill component 190b, second results data 930b generated from the second skill component 190b's execution with respect to the second NLU hypothesis.

The result data 930 may include various portions. For example, the result data 930 may include content (e.g., audio data, text data, and/or video data) to be output to a user. The result data 930 may also include a unique identifier used by the system(s) 120 and/or the skill system(s) 125 to locate the data to be output to a user. The result data 930 may also include an instruction. For example, if the user input corresponds to "turn on the light," the result data 930 may include an instruction causing the system to turn on a light associated with a profile of the device (110a/110b) and/or user.

The post-NLU ranker 965 may consider the first result data 930a and the second result data 930b to alter the first confidence score and the second confidence score of the first NLU hypothesis and the second NLU hypothesis, respectively. That is, the post-NLU ranker 965 may generate a third confidence score based on the first result data 930a and the first confidence score. The third confidence score may correspond to how likely the post-NLU ranker 965 determines the first skill will correctly respond to the user input. The post-NLU ranker 965 may also generate a fourth confidence score based on the second result data 930b and the second confidence score. One skilled in the art will appreciate that a first difference between the third confidence score and the fourth confidence score may be greater than a second difference between the first confidence score and the second confidence score. The post-NLU ranker 965 may also consider the other data 920 to generate the third confidence score and the fourth confidence score. While it has been described that the post-NLU ranker 965 may alter the confidence scores associated with first and second NLU hypotheses, one skilled in the art will appreciate that the post-NLU ranker 965 may alter the confidence scores of more than two NLU hypotheses. The post-NLU ranker 965 may select the result data 930 associated with the skill component 190 with the highest altered confidence score to be the data output in response to the current user input. The post-NLU ranker 965 may also consider the ASR results 205 to alter the NLU hypotheses confidence scores.

The orchestrator component may, prior to sending the NLU results data 985 to the post-NLU ranker 965, associate intents in the NLU hypotheses with skill components 190. For example, if a NLU hypothesis includes a <PlayMusic> intent, the orchestrator component may associate the NLU hypothesis with one or more skill components 190 that can execute the <PlayMusic> intent. Thus, the orchestrator component may send the NLU results data 985, including NLU hypotheses paired with skill components 190, to the post-NLU ranker 965. In response to ASR results 205 corresponding to "what should I do for dinner today," the orchestrator component may generates pairs of skill components 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 965 queries each skill component 190, paired with a NLU hypothesis in the NLU output data 985, to provide result data 930 based on the NLU hypothesis with which it is associated. That is, with respect to each skill, the post-NLU ranker 965 colloquially asks the each skill "if given this NLU hypothesis, what would you do with it." According to the above example, the post-NLU ranker 965 may send skill components 190 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 965 may query each of the skill components 190 in parallel or substantially in parallel.

A skill component 190 may provide the post-NLU ranker 965 with various data and indications in response to the post-NLU ranker 965 soliciting the skill component 190 for result data 930. A skill component 190 may simply provide the post-NLU ranker 965 with an indication of whether or not the skill can execute with respect to the NLU hypothesis it received. A skill component 190 may also or alternatively provide the post-NLU ranker 965 with output data generated based on the NLU hypothesis it received. In some situations, a skill component 190 may need further information in addition to what is represented in the received NLU hypothesis to provide output data responsive to the user input. In these situations, the skill component 190 may provide the post-NLU ranker 965 with result data 930 indicating slots of a framework that the skill component 190 further needs filled or entities that the skill component 190 further needs resolved prior to the skill component 190 being able to provided result data 930 responsive to the user input. The skill component 190 may also provide the post-NLU ranker 965 with an instruction and/or computer-generated speech indicating how the skill component 190 recommends the system solicit further information needed by the skill component 190. The skill component 190 may further provide the post-NLU ranker 965 with an indication of whether the skill component 190 will have all needed information after the user provides additional information a single time, or whether the skill component 190 will need the user to provide various kinds of additional information prior to the skill component 190 having all needed information. According to the above example, skill components 190 may provide the post-NLU ranker 965 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 930 includes an indication provided by a skill component 190 indicating whether or not the skill component 190 can execute with respect to a NLU hypothesis; data generated by a skill component 190 based on a NLU hypothesis; as well as an indication provided by a skill component 190 indicating the skill component 190 needs further information in addition to what is represented in the received NLU hypothesis.

The post-NLU ranker 965 uses the result data 930 provided by the skill components 190 to alter the NLU processing confidence scores generated by the reranker 990. That is, the post-NLU ranker 965 uses the result data 930 provided by the queried skill components 190 to create larger differences between the NLU processing confidence scores generated by the reranker 990. Without the post-NLU ranker 965, the system may not be confident enough to determine an output in response to a user input, for example when the NLU hypotheses associated with multiple skills are too close for the system to confidently determine a single skill component 190 to invoke to respond to the user input. For example, if the system does not implement the post-NLU ranker 965, the system may not be able to determine whether to obtain output data from a general reference information skill or a medical information skill in response to a user input corresponding to "what is acne."

The post-NLU ranker 965 may prefer skill components 190 that provide result data 930 responsive to NLU hypotheses over skill components 190 that provide result data 930 corresponding to an indication that further information is needed, as well as skill components 190 that provide result data 930 indicating they can provide multiple responses to received NLU hypotheses. For example, the post-NLU ranker 965 may generate a first score for a first skill component 190a that is greater than the first skill's NLU confidence score based on the first skill component 190a providing result data 930a including a response to a NLU hypothesis. For further example, the post-NLU ranker 965 may generate a second score for a second skill component 190b that is less than the second skill's NLU confidence score based on the second skill component 190b providing result data 930b indicating further information is needed for the second skill component 190b to provide a response to a NLU hypothesis. Yet further, for example, the post-NLU ranker 965 may generate a third score for a third skill component 190c that is less than the third skill's NLU confidence score based on the third skill component 190c providing result data 930c indicating the third skill component 190c can provide multiple responses to a NLU hypothesis.

The post-NLU ranker 965 may consider other data 920 in determining scores. The other data 920 may include rankings associated with the queried skill components 190. A ranking may be a system ranking or a user-specific ranking. A ranking may indicate a veracity of a skill from the perspective of one or more users of the system. For example, the post-NLU ranker 965 may generate a first score for a first skill component 190a that is greater than the first skill's NLU processing confidence score based on the first skill component 190a being associated with a high ranking. For further example, the post-NLU ranker 965 may generate a second score for a second skill component 190b that is less than the second skill's NLU processing confidence score based on the second skill component 190b being associated with a low ranking.

The other data 920 may include information indicating whether or not the user that originated the user input has enabled one or more of the queried skill components 190. For example, the post-NLU ranker 965 may generate a first score for a first skill component 190a that is greater than the first skill's NLU processing confidence score based on the first skill component 190a being enabled by the user that originated the user input. For further example, the post-NLU ranker 965 may generate a second score for a second skill component 190b that is less than the second skill's NLU processing confidence score based on the second skill component 190b not being enabled by the user that originated the user input. When the post-NLU ranker 965 receives the NLU results data 985, the post-NLU ranker 965 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 965 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 965 may increase the NLU processing confidence score associated with a first skill configured to output visual data and/or decrease the NLU processing confidence score associated with a second skill configured to output audio data.

The other data 920 may include information indicating the veracity of the result data 930 provided by a skill component 190. For example, if a user says "tell me a recipe for pasta sauce," a first skill component 190a may provide the post-NLU ranker 965 with first result data 930a corresponding to a first recipe associated with a five star rating and a second skill component 190b may provide the post-NLU ranker 965 with second result data 930b corresponding to a second recipe associated with a one star rating. In this situation, the post-NLU ranker 965 may increase the NLU processing confidence score associated with the first skill component 190a based on the first skill component 190a providing the first result data 930a associated with the five star rating and/or decrease the NLU processing confidence score associated with the second skill component 190b based on the second skill component 190b providing the second result data 930b associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 965 may increase the NLU processing confidence score associated with a first skill component 190a corresponding to a room service skill associated with the hotel and/or decrease the NLU processing confidence score associated with a second skill component 190b corresponding to a food skill not associated with the hotel.

The other data 920 may include information indicating a location of the device and/or user that originated the user input. The system may be configured with skill components 190 that may only operate with respect to certain geographic locations. For example, a user may provide a user input corresponding to "when is the next train to Portland." A first skill component 190a may operate with respect to trains that arrive at, depart from, and pass through Portland, Oregon. A second skill component 190b may operate with respect to trains that arrive at, depart from, and pass through Portland, Maine. If the device and/or user that originated the user input is located in Seattle, Washington, the post-NLU ranker 965 may increase the NLU processing confidence score associated with the first skill component 190a and/or decrease the NLU processing confidence score associated with the second skill component 190b. Likewise, if the device and/or user that originated the user input is located in Boston, Massachusetts, the post-NLU ranker 965 may increase the NLU processing confidence score associated with the second skill component 190b and/or decrease the NLU processing confidence score associated with the first skill component 190a.

The other data 920 may include information indicating a time of day. The system may be configured with skill components 190 that operate with respect to certain times of day. For example, a user may provide a user input corresponding to "order me food." A first skill component 190a may generate first result data 930a corresponding to breakfast. A second skill component 190b may generate second result data 930b corresponding to dinner. If the system(s) 120 receives the user input in the morning, the post-NLU ranker 965 may increase the NLU processing confidence score associated with the first skill component 190a and/or decrease the NLU processing score associated with the second skill component 190b. If the system(s) 120 receives the user input in the afternoon or evening, the post-NLU ranker 965 may increase the NLU processing confidence score associated with the second skill component 190b and/or decrease the NLU processing confidence score associated with the first skill component 190a.

The other data 920 may include information indicating user preferences. The system may include multiple skill components 190 configured to execute in substantially the same manner. For example, a first skill component 190a and a second skill component 190b may both be configured to order food from respective restaurants. The system may store a user preference (e.g., in the profile storage) that is associated with the user that provided the user input to the system(s) 120 as well as indicates the user prefers the first skill component 190a over the second skill component 190b. Thus, when the user provides a user input that may be executed by both the first skill component 190a and the second skill component 190b, the post-NLU ranker 965 may increase the NLU processing confidence score associated with the first skill component 190a and/or decrease the NLU processing confidence score associated with the second skill component 190b.

The other data 920 may include information indicating system usage history associated with the user that originated the user input. For example, the system usage history may indicate the user originates user inputs that invoke a first skill component 190a more often than the user originates user inputs that invoke a second skill component 190b. Based on this, if the present user input may be executed by both the first skill component 190a and the second skill component 190b, the post-NLU ranker 965 may increase the NLU processing confidence score associated with the first skill component 190a and/or decrease the NLU processing confidence score associated with the second skill component 190b.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 965 may increase the NLU processing confidence score associated with a first skill component 190a that generates audio data. The post-NLU ranker 965 may also or alternatively decrease the NLU processing confidence score associated with a second skill component 190b that generates image data or video data.

The other data 920 may include information indicating how long it took a skill component 190 to provide result data 930 to the post-NLU ranker 965. When the post-NLU ranker 965 multiple skill components 190 for result data 930, the skill components 190 may respond to the queries at different speeds. The post-NLU ranker 965 may implement a latency budget. For example, if the post-NLU ranker 965 determines a skill component 190 responds to the post-NLU ranker 965 within a threshold amount of time from receiving a query from the post-NLU ranker 965, the post-NLU ranker 965 may increase the NLU processing confidence score associated with the skill component 190. Conversely, if the post-NLU ranker 965 determines a skill component 190 does not respond to the post-NLU ranker 965 within a threshold amount of time from receiving a query from the post-NLU ranker 965, the post-NLU ranker 965 may decrease the NLU processing confidence score associated with the skill component 190.

It has been described that the post-NLU ranker 965 uses the other data 920 to increase and decrease NLU processing confidence scores associated with various skill components 190 that the post-NLU ranker 965 has already requested result data from. Alternatively, the post-NLU ranker 965 may use the other data 920 to determine which skill components 190 to request result data from. For example, the post-NLU ranker 965 may use the other data 920 to increase and/or decrease NLU processing confidence scores associated with skill components 190 associated with the NLU results data 985 output by the NLU component 160. The post-NLU ranker 965 may select n-number of top scoring altered NLU processing confidence scores. The post-NLU ranker 965 may then request result data 930 from only the skill components 190 associated with the selected n-number of NLU processing confidence scores.

As described, the post-NLU ranker 965 may request result data 930 from all skill components 190 associated with the NLU results data 985 output by the NLU component 160. Alternatively, the system(s) 120 may prefer result data 930 from skills implemented entirely by the system(s) 120 rather than skills at least partially implemented by the skill system(s) 125. Therefore, in the first instance, the post-NLU ranker 965 may request result data 930 from only skills associated with the NLU results data 985 and entirely implemented by the system(s) 120. The post-NLU ranker 965 may only request result data 930 from skills associated with the NLU results data 985, and at least partially implemented by the skill system(s) 125, if none of the skills, wholly implemented by the system(s) 120, provide the post-NLU ranker 965 with result data 930 indicating either data response to the NLU results data 985, an indication that the skill can execute the user input, or an indication that further information is needed.

As indicated above, the post-NLU ranker 965 may request result data 930 from multiple skill components 190. If one of the skill components 190 provides result data 930 indicating a response to a NLU hypothesis and the other skills provide result data 930 indicating either they cannot execute or they need further information, the post-NLU ranker 965 may select the result data 930 including the response to the NLU hypothesis as the data to be output to the user. If more than one of the skill components 190 provides result data 930 indicating responses to NLU hypotheses, the post-NLU ranker 965 may consider the other data 920 to generate altered NLU processing confidence scores, and select the result data 930 of the skill associated with the greatest score as the data to be output to the user.

A system that does not implement the post-NLU ranker 965 may select the highest scored NLU hypothesis in the NLU results data 985. The system may send the NLU hypothesis to a skill component 190 associated therewith along with a request for output data. In some situations, the skill component 190 may not be able to provide the system with output data. This results in the system indicating to the user that the user input could not be processed even though another skill associated with lower ranked NLU hypothesis could have provided output data responsive to the user input.

The post-NLU ranker 965 reduces instances of the aforementioned situation. As described, the post-NLU ranker 965 queries multiple skills associated with the NLU results data 985 to provide result data 930 to the post-NLU ranker 965 prior to the post-NLU ranker 965 ultimately determining the skill component 190 to be invoked to respond to the user input. Some of the skill components 190 may provide result data 930 indicating responses to NLU hypotheses while other skill components 190 may providing result data 930 indicating the skills cannot provide responsive data. Whereas a system not implementing the post-NLU ranker 965 may select one of the skill components 190 that could not provide a response, the post-NLU ranker 965 only selects a skill component 190 that provides the post-NLU ranker 965 with result data corresponding to a response, indicating further information is needed, or indicating multiple responses can be generated.

The post-NLU ranker 965 may select result data 930, associated with the skill component 190 associated with the highest score, for output to the user. Alternatively, the post-NLU ranker 965 may output ranked NLU output data 425 indicating skill components 190 and their respective post-NLU ranker rankings. Since the post-NLU ranker 965 receives result data 930, potentially corresponding to a response to the user input, from the skill components 190 prior to post-NLU ranker 965 selecting one of the skills or outputting the ranked NLU output data 425, little to no latency occurs from the time skills provide result data 930 and the time the system outputs responds to the user.

If the post-NLU ranker 965 selects result audio data to be output to a user and the system determines content should be output audibly, the post-NLU ranker 965 (or another component of the system(s) 120) may cause the device 110a and/or the device 110b to output audio corresponding to the result audio data. If the post-NLU ranker 965 selects result text data to output to a user and the system determines content should be output visually, the post-NLU ranker 965 (or another component of the system(s) 120) may cause the device 110b to display text corresponding to the result text data. If the post-NLU ranker 965 selects result audio data to output to a user and the system determines content should be output visually, the post-NLU ranker 965 (or another component of the system(s) 120) may send the result audio data to the ASR component 150. The ASR component 150 may generate output text data corresponding to the result audio data. The system(s) 120 may then cause the device 110b to display text corresponding to the output text data. If the post-NLU ranker 965 selects result text data to output to a user and the system determines content should be output audibly, the post-NLU ranker 965 (or another component of the system(s) 120) may send the result text data to the TTS component 178. The TTS component 178 may generate output audio data (corresponding to computer-generated speech) based on the result text data. The system(s) 120 may then cause the device 110a and/or the device 110b to output audio corresponding to the output audio data.

As described, a skill component 190 may provide result data 930 either indicating a response to the user input, indicating more information is needed for the skill component 190 to provide a response to the user input, or indicating the skill component 190 cannot provide a response to the user input. If the skill component 190 associated with the highest post-NLU ranker score provides the post-NLU ranker 965 with result data 930 indicating a response to the user input, the post-NLU ranker 965 (or another component of the system(s) 120, such as an orchestrator component) may simply cause content corresponding to the result data 930 to be output to the user. For example, the post-NLU ranker 965 may send the result data 930 to the orchestrator component. The orchestrator component may cause the result data 930 to be sent to the device (110*a*/110*b*), which may output audio and/or display text corresponding to the result data 930. The orchestrator component may send the result data 930 to the ASR component 150 to generate output text data and/or may send the result data 930 to the TTS component 178 to generate output audio data, depending on the situation.

The skill component 190 associated with the highest post-NLU ranker score may provide the post-NLU ranker 965 with result data 930 indicating more information is needed as well as instruction data. The instruction data may indicate how the skill component 190 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 965 may simply cause the received instruction data be output by the device (110*a*/110*b*). Alternatively, the instruction data may be in a format that is not capable of being output by the device (110*a*/110*b*). When this occurs, the post-NLU ranker 965 may cause the ASR component 150 or the TTS component 178 to process the instruction data, depending on the situation, to generate instruction data that may be output by the device (110*a*/110*b*). Once the user provides the system with all further information needed by the skill component 190, the skill component 190 may provide the system with result data 930 indicating a response to the user input, which may be output by the system as detailed above.

The system may include "informational" skill components 190 that simply provide the system with information, which the system outputs to the user. The system may also include "transactional" skill components 190 that require a system instruction to execute the user input. Transactional skill components 190 include ride sharing skills, flight booking skills, etc. A transactional skill component 190 may simply provide the post-NLU ranker 965 with result data 930 indicating the transactional skill component 190 can execute the user input. The post-NLU ranker 965 may then cause the system to solicit the user for an indication that the system is permitted to cause the transactional skill component 190 to execute the user input. The user-provided indication may be an audible indication or a tactile indication (e.g., activation of a virtual button or input of text via a virtual keyboard). In response to receiving the user-provided indication, the system may provide the transactional skill component 190 with data corresponding to the indication. In response, the transactional skill component 190 may execute the command (e.g., book a flight, book a train ticket, etc.). Thus, while the system may not further engage an informational skill component 190 after the informational skill component 190 provides the post-NLU ranker 965 with result data 930, the system may further engage a transactional skill component 190 after the transactional skill component 190 provides the post-NLU ranker 965 with result data 930 indicating the transactional skill component 190 may execute the user input.

In some instances, the post-NLU ranker 965 may generate respective scores for first and second skills that are too close (e.g., are not different by at least a threshold difference) for the post-NLU ranker 965 to make a confident determination regarding which skill should execute the user input. When this occurs, the system may request the user indicate which skill the user prefers to execute the user input. The system may output TTS-generated speech to the user to solicit which skill the user wants to execute the user input.

Figure 10:
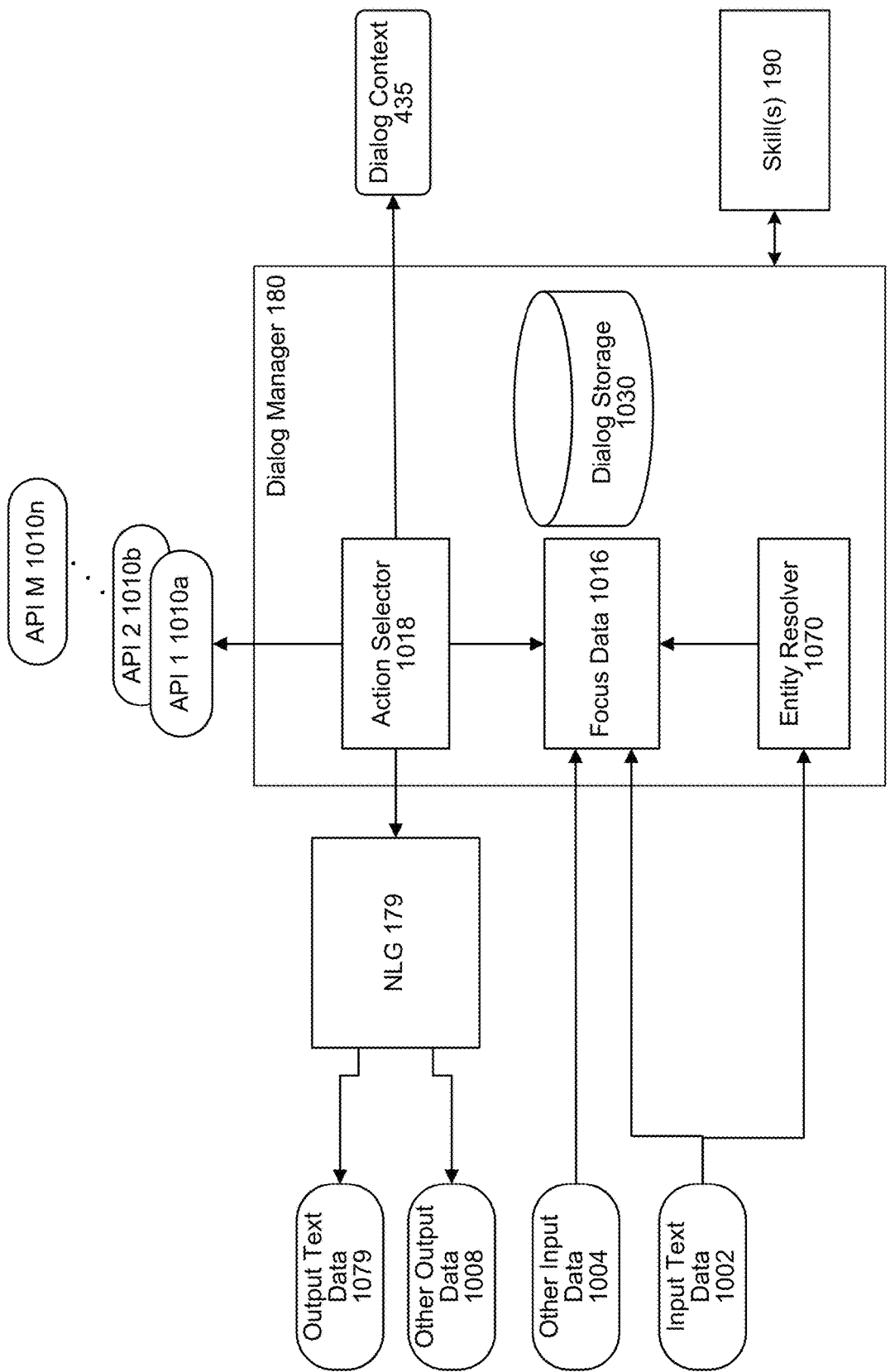
FIG. 10 is a conceptual diagram of components of a dialog manager component, according to embodiments of the present disclosure.

FIG. 10 is a conceptual diagram of components of a dialog manager 180, according to embodiments of the present disclosure. One or more components shown in FIG. 10 may be part of the dialog manager 180. For example, the dialog manager 180 may include the entity resolver 1070, the focus data component 1016 and the action selector 1018. The dialog manager 180 may work in concert with other language processing components, for example NLU 160, or may operate instead of such components in certain embodiments.

The system receives input text data 1002 which may be received, for example, by a device 110 or from another component of the system (for example as ASR results 205). The input text data 1002 may include text corresponding to a user input and metadata indicating further information about the text (such as an identity of the user for example determined by SID 254). The input text data 1002 may be text representing words, instructions, markup language, speech, or gestures, or may be a vector or other representation of the same. The input text data 1002 may be generated by a user via a keyboard, touchscreen, microphone, camera, or other such input device. In other embodiments, the input text data 1002 is created using ASR, as described above, from audio data received from a user. The system may further receive other input data 1004, which may correspond to a button press, gesture, or other input, such as image data as may interpreted by device 110, system 120, or other component. As described in greater detail below, using the input text data 1002 and/or other input data 1004, the system may determine and output text data 1079 and/or other output data 1008. The system may instead or in addition perform an action based on the input text data 1002 and/or other input data 1004, such as calling one or more APIs 1010.

An entity resolver 1070 may be used to determine that the input text data 1002 includes a representation of one or more entities, a process that may include named entity recognition (NER)—i.e., determining that the input text data 1002 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names. The entity resolver 1070 may operate similarly to NER component 962 and/or entity resolution component 970 discussed herein with regard to NLU operations.

In some embodiments, a single entity resolver 1070 is used for more than one domain (i.e., a "cross-domain" entity resolver 1070). Each domain may correspond to one or more dialog models. One or more candidate domains corresponding to the input text data 1002 may be determined; entity resolvers 1070 corresponding to the candidate domains may be used to process the input text data 1002. The dialog focus data 1016 may store the output entities from each candidate domain and may remove unselected entities when an API 1010 is selected or an action to be performed is determined.

The dialog focus data 1016 may store state data (for example in dialog storage 1030) corresponding to dialog history data (including an intent(s), an entity(ies), etc. corresponding to a prior turn in the dialog), action history data, and/or other data. In some embodiments, the other components (e.g., the action selector 1018) do not store state data and instead query the dialog focus data 1016 for the state data. The system may send some or all of the dialog focus data 1016 to other systems and/or may receive additional dialog focus data from other systems. In some embodiments, the other components (e.g., the action selector 1018) include a feature-extractor component to extract features from the dialog focus data 1016.

The dialog focus data 1016 may be graph-based data including a plurality of graph nodes; each graph node may correspond to an item of state data, such as an entity type, entity value, prior API call, and/or user data. The other components, such as the action selector 1018, may access all of the graph nodes of the dialog focus data 1016 or may access only a subset of the graph nodes of the dialog focus data 1016. The dialog focus data 1016 may be any type of storage mechanism and may serve as long-term and/or short term memory for the system, thus enabling tracking of entities, ASR output, TTS output, and other features) at each turn through a dialog. In some embodiments, the dialog focus data 1016 is updated after each turn of dialog with updated dialog focus data; in other embodiments, the dialog focus data 1016 is updated after an end of a dialog is determined.

The entity resolver 1070 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skill components 190 (e.g., a shopping skill, a music skill, a video skill, etc.), or may be organized in a variety of other ways.

The entity resolver 1070 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolver 1070.

The focus data 1016 may store data relevant to a dialog. In various embodiments, the dialog focus data 1016 stores the input text data 1002, other input data 1004, entity data from the entity resolver 1070 and/or action data and dialog data from an action selector 1018. The dialog focus data 1016 may further include additional information, such as location data, user preference data, and environment data. In various embodiments, the dialog focus data 1016 uses an encoder to encode some or all of the received data into one or more feature vectors and a decoder to determine, based on the feature vectors, intent data corresponding to an intent of a user. The dialog focus data 1016 may further include state data that represents prior dialog, actions, or other prior user information or data.

The action selector 1018 determines an action to be performed in response to the user request, where the action may include calling an API to perform an action and/or presenting an output to the user. The action selector 1018 may include a trained model(s), and may process the dialog focus data 1016. If the action selector 1018 determines to invoke an API call, one or more APIs 1010 may be activated and a corresponding action carried out. If the action selector 1018 determines to present a prompt or other output data to the user, the NLG component 179 may be used to generate the output text data 1079 and/or other output data 1008. In either case, the action selection 1018 may update the dialog focus data 1016 based on the API call or the output presented to the user.

In some embodiments, the action selector 1018 may process data from the dialog storage 1030 to select one or more skill components 190/skill system(s) 125 capable of responding to the user request, and present the selected skill to the user using the output text data 1079.

In some embodiments, the action selector 1018 may generate dialog context data 435 based on previous events in the dialog. The dialog manager 180 may send the dialog context data 435 to one or more other components of the system 100 including, for example, the NLU component 160 (e.g., for resolving anaphora, exophora, and the like) and/or the endpoint decision component 170 (e.g., for determining a likelihood that a potential endpoint represents a final endpoint for received speech based in part on information received or determined during previous events in the dialog).

In some embodiments, the system(s) 120 may determine past interaction data, such as a satisfaction rating corresponding to skill(s) 190 and store it in the storage 1030. The satisfaction rating may be based on past interactions between users of the system(s) 120 and the skill. In some embodiments, the system(s) 120 may determine a user-specific satisfaction rating corresponding to the skill based on user-specific data, interaction-specific data and/or focus data 1016, such as, user profile data associated with the specific user, location data, past user interactions with the system(s) 120, past user interactions with the skill component 190, user preferences, device type for the device 110 that received the user request, device type for the device 110 that may output/respond to the user request, device capabilities, dialog state of previous turns in the dialog, and other data.

In some embodiments, users may provide feedback to the system(s) 120 or the skill system(s) 125 indicating the user's satisfaction in the service skill responding to the user request/performing an action in response to the user request. The feedback may be solicited by the system(s) 120 or the skill system(s) 125. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The action selector 1018 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 1018 may select a skill based on skill availability, for example, a reservations at a restaurant may indicate availability or no availability for a particular day. The system(s) 120/action selector 1018 may determine the number of diners at a restaurant or the number of takeout orders a restaurant is handling based on the number of user requests the system(s) 120 routed to the skill. In another example, the system(s) 120/action selector 1018 may determine that a number of user requests were routed to a first skill for a first location/geographic area (e.g., a city), and may determine to route the next/future user requests to another skill for that geographic area.

For a restaurant reservation, the action selector 1018 may select a skill based on a number of people in the user's party, since some restaurants may not make reservations for small parties less than a particular number. The action selector 1018 may select a skill based on person(s) other than the user that may be involved in the user request. For example, if the user says "Alexa, what should we do tomorrow?" the system(s) 120 may determine information relating to the other persons in the user's household to select a skill.

The action selector 1018 may select a skill based on the dialog state where the dialog state indicates multiple turns/attempts to recommend a skill/service provider, and the action selector 1018 may modify the search criteria (e.g., expand the zip code, expand the time frame, etc.) to select a skill.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
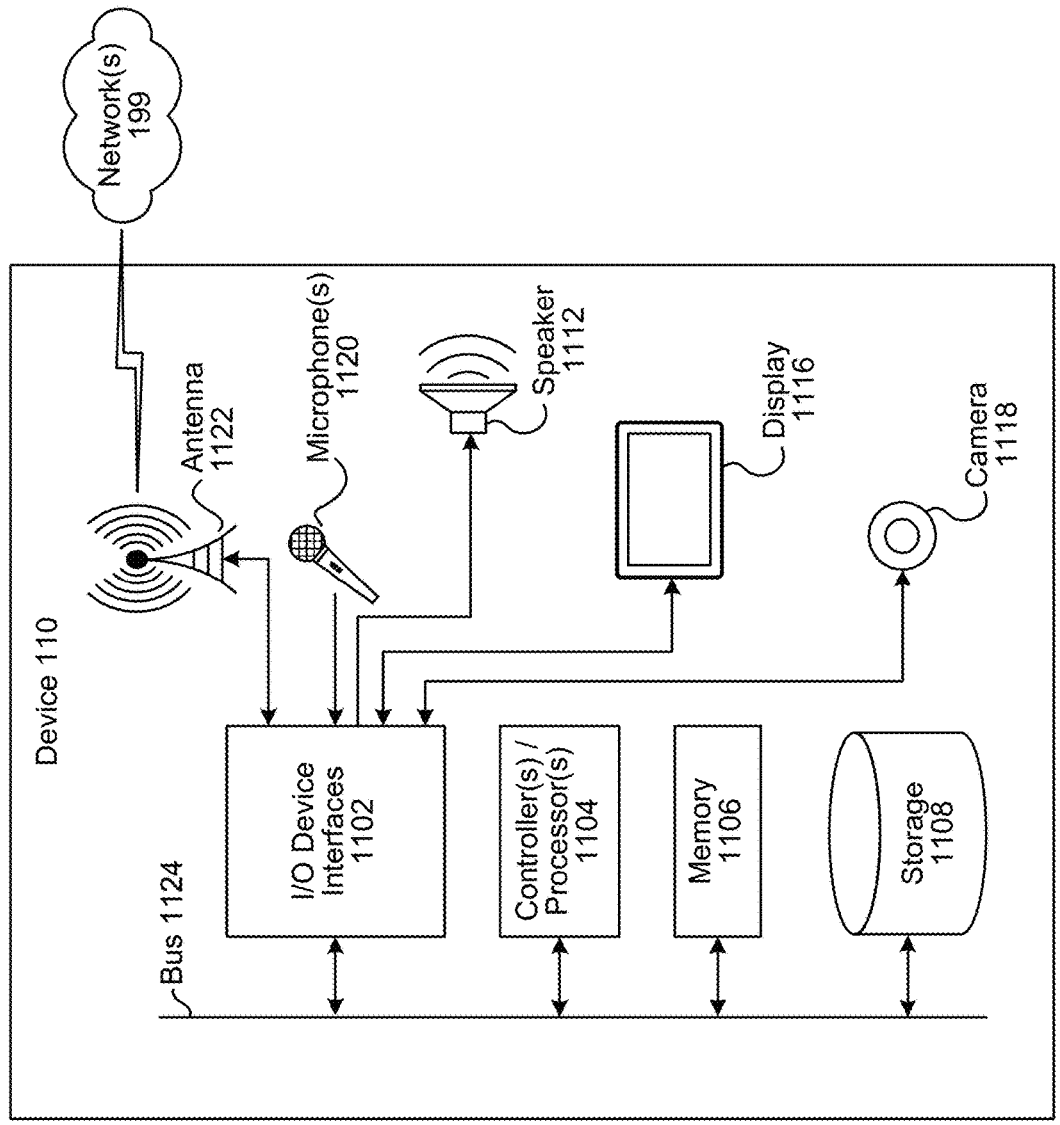
FIG. 11 is a block diagram conceptually illustrating example components of a device, according to embodiments of the present disclosure.
Figure 12:
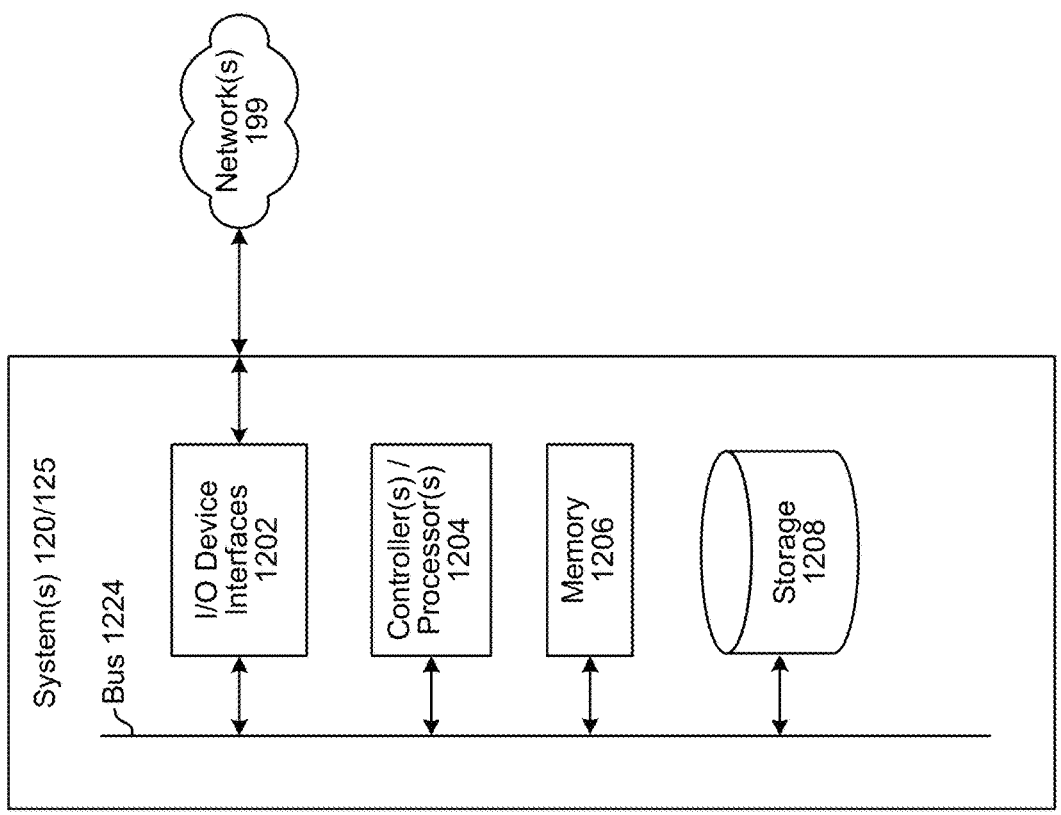
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a remote device, such as the natural language command processing system 120, which may assist with ASR processing, NLU processing, etc., and a skill support system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system 120, or a skill support system 125 may include their own dedicated processors, memory, and/or storage. Alternatively, one or more of the components of the device(s) 110, the natural language command processing system 120, or a skill support system 125 may utilize the I/O interfaces (1102/1202), processor(s) (1104/1204), memory (1106/1206), and/or storage (1108/1208) of the device(s) 110, natural language command processing system 120, or the skill support system 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill support system 125, as described herein, are illustrative, and may be located as a stand-alone device or may be included, in whole or in part, as a component of a larger device or system. As can be appreciated, a number of components may exist either on a system 120 and/or on device 110. For example, the language processing components (which may include the ASR component 150 and/or the NLU component 160), language output components 193 (which may include NLG 179 and TTS 178), etc. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
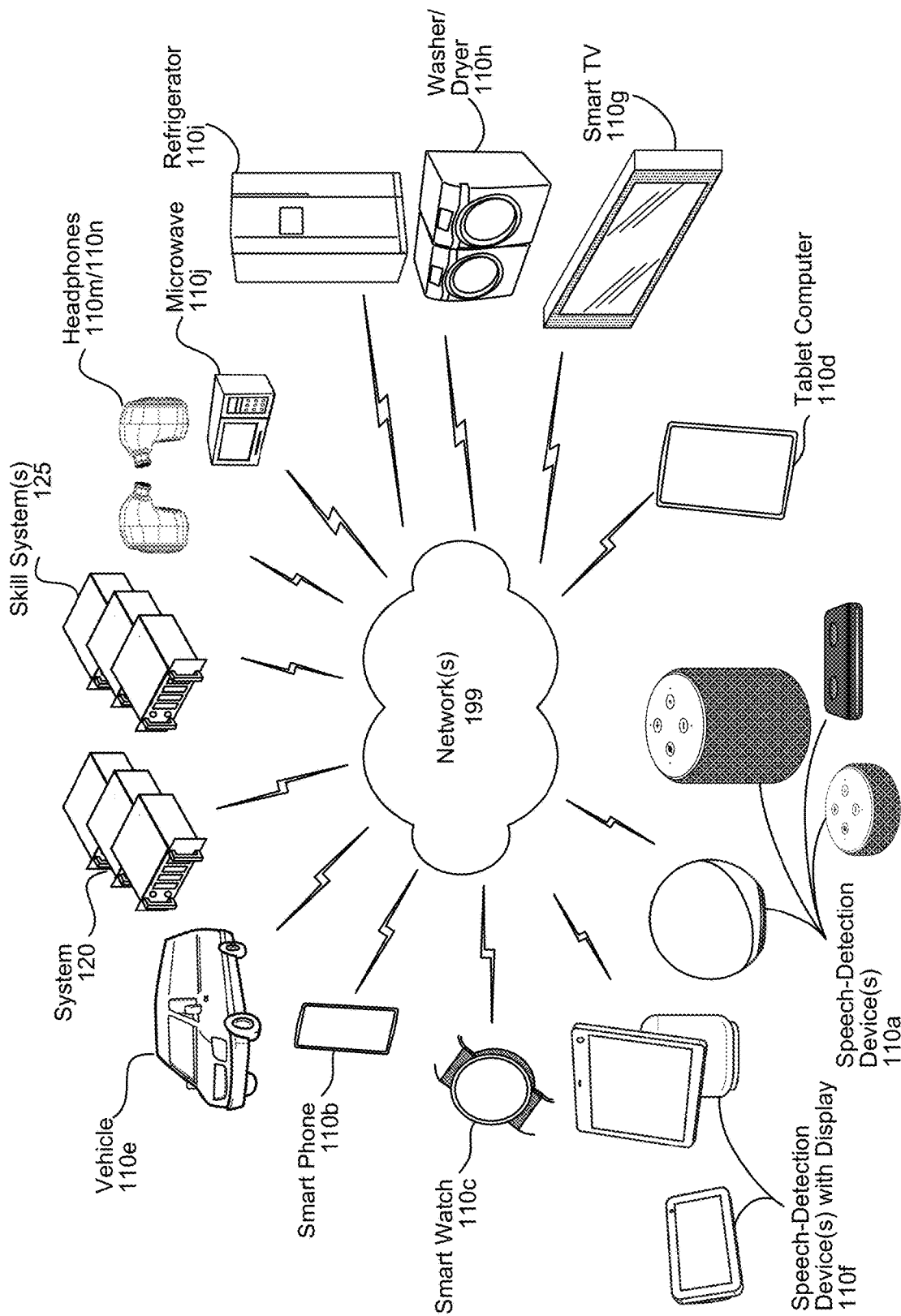
FIG. 13 illustrates an example of a computer network for use with the overall system, according to embodiments of the present disclosure.

As illustrated in FIG. 13, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
receiving audio data representing speech;
processing the audio data using a first model representing a recurrent neural network transducer (RNN-T) to generate at least first automatic speech recognition (ASR) results data, the first ASR results data representing a first transcript of the speech and a first endpoint score indicating a likelihood that the first transcript is a complete user input;
determining that the first endpoint score satisfies a first condition;
in response to determining that the first endpoint score satisfies the first condition, sending the first ASR results data to a natural language understanding (NLU) component for further processing;
receiving first NLU output data from the NLU component representing a meaning of the first transcript;
processing the first ASR results data and the first NLU output data using a second model representing a deep neural network (DNN) to determine that the first transcript likely represents an incomplete user input;
in response to determining that the first transcript likely represents an incomplete user input, generating second ASR results data including a second transcript of the speech and a second endpoint score representing a likelihood that the second transcript includes a complete user input;
sending the second ASR results data to the NLU component for further processing;
receiving second NLU output data from the NLU component;
processing the second ASR results data and the second NLU output data using the second model to determine that the second transcript likely represents a complete user input; and
in response to determining that the second transcript likely represents a complete user input, stopping processing of the audio data using the first model.

2. The method of claim 1, further comprising:
sending first data representing the first NLU output data to a skill component;
determining, using the second model, that the second NLU output data represents a self-correction of contents of the first NLU output data;
in response to determining that the second NLU output data represents a self-correction of contents of the first NLU output data, sending second data representing the second NLU output data to the skill component; and
causing the skill component to perform a first action indicated by the second data but not a second action indicated by the first data.

3. The method of claim 1, further comprising:
determining a first skill component associated with a first intent indicated by the first NLU output data;
sending first data representing the first NLU output data to a first skill component;
in response to determining that the first transcript likely represents an incomplete user input, causing the first skill component to pause execution with respect to the first data;
determining a second skill component associated with a second intent indicated by the second NLU output data, the second skill component different from the first skill component;
sending second data representing the second NLU output data to the second skill component; and
in response to determining that the second transcript likely represents a complete user input, causing the second skill component to perform an action indicated by the second data.

4. The method of claim 1, further comprising:
receiving, at a user device, an indication to generate the audio data based on audio received at a microphone of the user device;
in response to the indication, causing the user device to display a first visual indication that the user device is in a first listening mode;

in response to determining that the first endpoint score satisfies the first condition, causing the user device to display a second visual indication that the user device is in a second listening mode while processing the first ASR results data; and in response to determining that the second transcript likely represents a complete user input, causing the user device to display a third visual indication that speech received by the user device is no longer being processed using the first model.

5. A computer-implemented method comprising:

receiving audio data representing first speech;

processing the audio data to generate at least first automatic speech recognition (ASR) results data representing: (i) a first transcript of the first speech and (ii) a first likelihood that the first transcript represents a complete user input;

determining that the first likelihood satisfies a condition;

in response to determining that the first likelihood satisfies the condition, performing natural language understanding (NLU) processing using the first ASR results data to generate first NLU output data;

processing at least the first ASR results data and the first NLU output data using a machine learning model to determine that the first transcript likely represents an incomplete user input; and in response to determining that the first transcript likely represents an incomplete user input, performing NLU processing using second ASR results data to generate second NLU output data, the second ASR results data generated after the first ASR results data based on second speech received after the first speech.

6. The computer-implemented method of claim 5, further comprising:

processing the second ASR results data and the second NLU output data to determine that the second ASR results data likely represents a complete user input; and in response to determining that the second ASR results data likely represents a complete user input, performing an action associated with the second NLU output data.

7. The computer-implemented method of claim 5, further comprising:

sending, to a skill component, the first NLU output data; and in response to determining that the first transcript likely represents an incomplete user input, causing the skill component to pause execution with respect to the first NLU output data.

8. The computer-implemented method of claim 7, further comprising:

sending, to the skill component, the second NLU output data;

determining that the second ASR results data likely represents a complete user input; and in response to determining that the second ASR results data likely represents a complete user input, causing the skill component to perform an action associated with the second NLU output data.

9. The computer-implemented method of claim 5, further comprising:

identifying a representation of a speech hesitation in the first ASR results;

determining, using at least the identified representation, that the first transcript likely represents an incomplete user input; and in response to determining that the first transcript likely represents an incomplete user input, processing the second ASR results data to generate the second NLU output data.

10. The computer-implemented method of claim 5, further comprising:

determining that the second NLU output data represents a self-correction of contents of the first NLU output data; and in response to determining that the second NLU output data represents a self-correction of contents of the first NLU output data, performing a first action associated with the second NLU output data but not a second action associated with the first NLU output data.

11. The computer-implemented method of claim 5, further comprising:

receiving, at a user device, an indication to generate the audio data based on audio received at a microphone of the user device;

in response to the indication, causing the user device to display a first visual indication that the user device is in a first listening mode; and in response to determining that the first transcript likely represents an incomplete user input, causing the user device to display a second visual indication that the user device is in a second listening mode while processing the first ASR results data.

12. The computer-implemented method of claim 11, further comprising:

processing the second ASR results data and the second NLU output data to determine that the second ASR results data likely represents a complete user input; and in response to determining that the second ASR results data likely represents a complete user input, causing the user device to display a third visual indication that speech received by the user device is no longer being transcribed.

13. A system, comprising:

at least one processor; and at least one memory comprising instructions that, when executed by the at least one processor, cause the system to:

receive audio data representing first speech;

process the audio data to generate at least first automatic speech recognition (ASR) results data representing: (i) a first transcript of the first speech and (ii) a first likelihood that the first transcript represents a complete user input;

determine that the first likelihood satisfies a condition;

in response to determining that the first likelihood satisfies the condition, perform natural language understanding (NLU) processing using the first ASR results data to generate first NLU output data;

process at least the first ASR results data and the first NLU output data using a machine learning model to determine that the first transcript likely represents an incomplete user input; and in response to determining that the first transcript likely represents an incomplete user input, perform NLU processing using second ASR results data to generate second NLU output data, the second ASR results data generated after the first ASR results data based on second speech received after the first speech.

14. The system of claim 13, wherein the at least one memory further comprises instructions that, when executed by the at least one processor, further cause the system to:

process the second ASR results data and the second NLU output data to determine that the second ASR results data likely represents a complete user input; and in response to determining that the second ASR results data likely represents a complete user input, perform an action associated with the second NLU output data.

15. The system of claim 13, wherein the at least one memory further comprises instructions that, when executed by the at least one processor, further cause the system to:
send, to a skill component, the first NLU output data; and
in response to determining that the first transcript likely represents an incomplete user input, cause the skill component to pause execution with respect to the first NLU output data.

16. The system of claim 15, wherein the at least one memory further comprises instructions that, when executed by the at least one processor, further cause the system to:
send, to the skill component, the second NLU output data;
determine that the second ASR results data likely represents a complete user input; and
in response to determining that the second ASR results data likely represents a complete user input, cause the skill component to perform an action associated with the second NLU output data.

17. The system of claim 13, wherein the at least one memory further comprises instructions that, when executed by the at least one processor, further cause the system to:
identify a representation of a speech hesitation in the first ASR results data;
determine, using at least the identified representation, that the first transcript likely represents an incomplete user input; and
in response to determining that the first transcript likely represents an incomplete user input, process the second ASR results data to generate the second NLU output data.

18. The system of claim 13, wherein the at least one memory further comprises instructions that, when executed by the at least one processor, further cause the system to:
determine that the second NLU output data represents a self-correction of contents of the first NLU output data; and
in response to determining that the second NLU output data represents a self-correction of contents of the first NLU output data, perform a first action associated with the second NLU output data but not a second action associated with the first NLU output data.

19. The system of claim 13, wherein the at least one memory further comprises instructions that, when executed by the at least one processor, further cause the system to:
receive, at a user device, an indication to generate the audio data based on audio received at a microphone of the user device;
in response to the indication, cause the user device to display a first visual indication that the user device is in a first listening mode; and
in response to determining that the first transcript likely represents an incomplete user input, causing the user device to display a second visual indication that the user device is in a second listening mode while processing the first ASR results data.

20. The system of claim 19, wherein the at least one memory further comprises instructions that, when executed by the at least one processor, further cause the system to:
process the second ASR results data and the second NLU output data to determine that the second ASR results data likely represents a complete user input; and
in response to determining that the second ASR results data likely represents a complete user input, cause the user device to display a third visual indication that speech received by the user device is no longer being transcribed.

* * * * *